(12) United States Patent
Kulkarni et al.

(10) Patent No.: US 7,295,998 B2
(45) Date of Patent: Nov. 13, 2007

(54) METHODS AND SYSTEMS FOR MANAGING TAX AUDIT INFORMATION

(75) Inventors: Ravindra Raghunath Rao Kulkarni, Fort Myers, FL (US); John Joseph Ryan, Fort Myers, FL (US); Susan Elaine Byrd, Fort Myers, FL (US); Carol Sue Vigliano, Naples, FL (US); Thomas Forrest Harlacher, Fort Myers, FL (US); Jason Robert Hinds, Fort Myers, FL (US)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 10/062,011

(22) Filed: Jan. 31, 2002

(65) Prior Publication Data

US 2003/0144930 A1 Jul. 31, 2003

(51) Int. Cl.
*G06F 17/22* (2006.01)
(52) U.S. Cl. .............................. 705/31; 705/30; 705/19
(58) Field of Classification Search ................... 705/31, 705/30, 19
See application file for complete search history.

(56) References Cited

U.S. PATENT DOCUMENTS

| | | | |
|---|---|---|---|
| 3,944,801 A | 3/1976 | Montana | |
| 3,946,217 A | 3/1976 | Tsujikawa et al. | |
| 3,963,910 A | 6/1976 | Enomoto et al. | |
| 4,109,686 A | 8/1978 | Phillips | |
| 4,324,975 A | 4/1982 | Rees | |
| 4,630,292 A | 12/1986 | Juricich et al. | |
| 4,890,228 A | 12/1989 | Longfield | |
| 4,994,657 A | 2/1991 | Charwat | |
| 5,138,549 A | 8/1992 | Bern | |
| 5,193,057 A | 3/1993 | Longfield | |
| 5,644,724 A | 7/1997 | Cretzler | |
| 5,694,322 A | 12/1997 | Westerlage et al. | |
| 5,724,523 A | 3/1998 | Longfield | |
| 5,772,251 A | 6/1998 | Fleck | |
| 5,799,283 A | 8/1998 | Francisco et al. | |
| 5,819,249 A | 10/1998 | Dohanich et al. | |
| 5,875,433 A | 2/1999 | Francisco et al. | |

(Continued)

FOREIGN PATENT DOCUMENTS

EP          1195706 A2  *  10/2002

OTHER PUBLICATIONS

Rao, Anand, "You ought to audit . . . ", LAN Magazine, vol. 7 No. 9, p. 43, Sep. 1992.*

(Continued)

*Primary Examiner*—F. Zeender
*Assistant Examiner*—Christopher Buchanan
(74) *Attorney, Agent, or Firm*—Armstrong Teasdale LLP

(57) ABSTRACT

A method for managing tax audit (TA) information for a business entity using a server system is provided. The server system is coupled to a centralized database and at least one client system. The method includes receiving at the server system TA information from the client system, storing TA information received at the server system in the centralized database, tracking TA information stored in the centralized database, updating the centralized database periodically with newly received TA information to maintain TA information, and providing TA information in response to an inquiry.

41 Claims, 40 Drawing Sheets

U.S. PATENT DOCUMENTS

| | | |
|---|---|---|
| 5,903,876 A | 5/1999 | Hagemier |
| 5,963,921 A | 10/1999 | Longfield |
| 5,970,481 A | 10/1999 | Westerlage et al. |
| 6,003,016 A | 12/1999 | Hagemier |
| H1830 H | 1/2000 | Petrimoulx et al. |
| 6,016,479 A | 1/2000 | Taricani, Jr. |
| 6,064,983 A | 5/2000 | Koehler |
| 6,078,899 A | 6/2000 | Francisco et al. |
| 6,115,697 A | 9/2000 | Gottstein |
| 6,202,052 B1 | 3/2001 | Miller |
| 6,298,333 B1 | 10/2001 | Manzi et al. |
| 6,347,304 B1 | 2/2002 | Taricani, Jr. |
| 6,360,208 B1 | 3/2002 | Ohanian et al. |
| 6,847,942 B1* | 1/2005 | Land et al. .................... 705/30 |
| 2001/0044734 A1* | 11/2001 | Walker et al. ................. 705/4 |
| 2002/0052792 A1* | 5/2002 | Johnson et al. ............... 705/19 |
| 2003/0040992 A1* | 2/2003 | Ryan et al. .................... 705/31 |
| 2003/0195780 A1* | 10/2003 | Arora et al. ................... 705/7 |
| 2004/0205030 A1* | 10/2004 | Fox .............................. 705/78 |
| 2005/0055290 A1* | 3/2005 | Bross et al. ................... 705/31 |

OTHER PUBLICATIONS

Wallman, Steven, "The future of accounting and financial reporting, part IV: Access accounting", Accounting Horizons, vol. 11 No. 2, p. 103, Jun. 1997.*

* cited by examiner

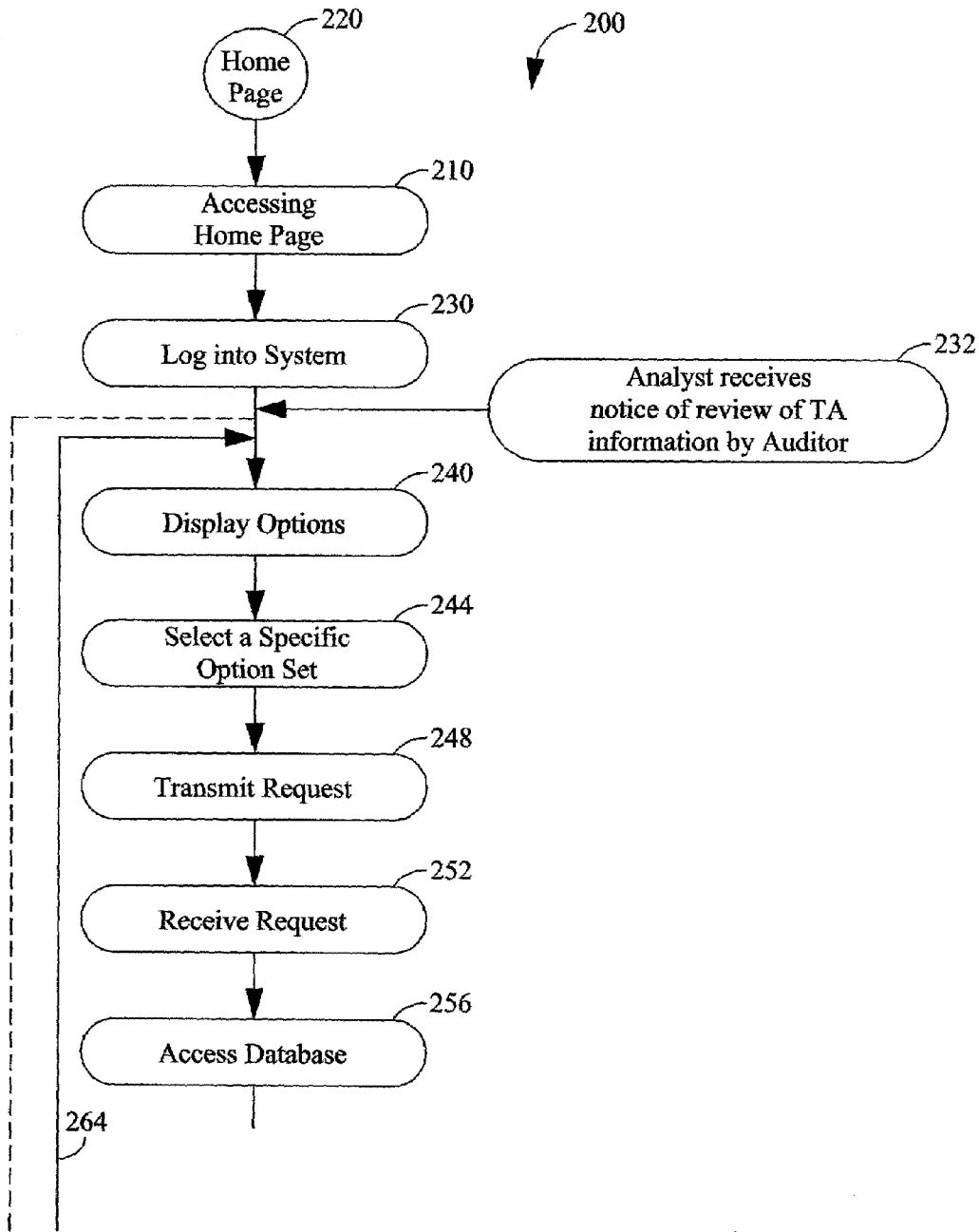
FIG. 4A  ↓ FIG. 4B

The eAudit application has been designed to provide easy access to information requested by state and/or local authority in the use tax examination of the company and its subsidiaries. By use of this application, you agree to the following conditions:

*The information contained herein may not be reproduced in any form, in part or whole, without express permission from Client Business.*

*The eAudit application contains proprietary information and may not be reproduced, in part or whole, under any circumstances.*

*The eAudit application and the information contained therein is intended for use in the state and/or local use tax examination process exclusively.*

Should you at any time need assistance with this application, please contact the Examinations Analyst managing your audit.

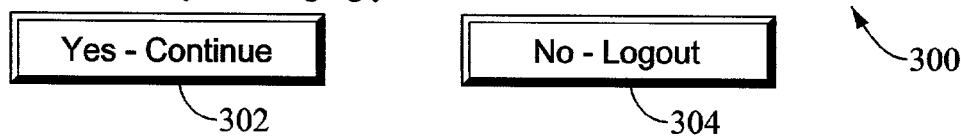

| Reference | CBI | Vendor Name | Voucher | Tax Rate | Status | Voucher Desc | Comments | Image |
|---|---|---|---|---|---|---|---|---|
| Merch. Amt | Tax Ind | Tax Base | | | Jurisdiction Status | Account Desc | Jurisdiction Comments | Acct Number |
| 1 | | SUN CIRCUIT | ACQ3KJ | | | ANALOG PWB PATTB | Comts--12345> | |
| $1,615.00 | T | -$1,615.00 | | 5 | No Issue▼ | | | 062112900 |
| 2 | | MASON JUDI | 479599 | | | FIN PROD DM S&RP | Comts--12345> | |
| -$3,344.66 | T | -$3,344.66 | | 5 | No Issue▼ | | | 529504701 |
| 3 | | VWR SCIENT | 480049 | | | FURNACE LAB | Comts--12345> | |

Total - Merch. Amount: $2,807,094.86  550 record(s) retrieved.
Filter - Merch. Amount: $0.00  0 record(s) retrieved.

Reference Number [ ] [Go] [Previous>200] [Next>200] [Email/Mess.]

[Refresh] [Change Audit] [Filter] [Save] [Logout]

eAudit Data Load

Audit List

490

| Legal Entity | Jurisdiction | Audit From | Audit To |
|---|---|---|---|
| PARENT | FLORIDA | 01/01/00 | 01/01/00 |
| PARENT | FLORIDA | 01/01/00 | 01/01/00 |
| PARENT | FLORIDA | 01/01/00 | 01/01/00 |
| PARENT | FLORIDA | 01/01/00 | 01/01/00 |
| CAPITAL | OHIO | 01/01/00 | 01/01/00 |
| CAPITAL | OHIO | 01/01/00 | 01/01/00 |
| CAPITAL | OHIO | 01/01/00 | 01/01/00 |
| CAPITAL | OHIO | 01/01/00 | 01/01/00 |
| PARENT | CALIFORNIA | 01/01/96 | 12/31/99 |
| CAPITAL | OHIO | 01/01/00 | 01/01/00 |

[New Audit / Sample]  [Append Audit / Sample]  [Exit]

Start  eAudit Data Load                            3:19 PM

FIG. 12

| Access Table Column | Data Type | eAudit Column | |
|---|---|---|---|
| | | Header | Detail |
| VENDOR NUM | Text | vendor_num | |
| VENDOR NAME | Text | vendor_remit_name | |
| INVOICE NUM | Text | invoice_num | |
| INVOICE DATE | Text | invoice_date | |
| CHECK NUM | Text | check_num | |
| CHECK DESC | Text | check_desc | |
| CHECK DATE | Text | check_date | |
| PO NUM | Text | po_num | |
| PROGRESS IND | Text | progress_ind | |
| FOB CODE | Text | fob_code | |
| TYPE CODE | Text | type_code | |
| SHIP TO ZIP | Text | ship_to_zip | |
| INV FREIGHT AMT | Number | freight_amt | |
| INV TAX PAID | Number | tax_paid | |
| INV GROSS AMT | Number | gross_amt | |
| INV NET PAID AMT | Number | net_amt_paid | |
| INV DISCOUNT AMT | Number | discount_amt | |
| INV USE TAX AMT | Number | tax_amt | |
| INV TAXABLE AMT | Number | invoice_taxable_amt | |
| REFERENCE NUM | Number | | reference_num |
| ACCOUNT NUM | Text | | account_num |
| SUB ACCT NUM | Text | | sub_account_num |
| ACCOUNT DESC | Text | | account_desc |
| COST CTR | Text | | cost_center_office_code |
| COST CENTER DESC | Text | | cost_center_desc |
| PROJECT NUM | Text | | project_contract_job |
| GL ID | Text | | general_ledger_id |
| CORP CODE | Text | | corp_business_code |
| VOUCHER NUM | Text | | voucher_num |
| VOUCHER DESC | Text | | voucher_desc |
| PO LINE NUM | Text | | po_line_item_num |
| MERCH AMT | Number | | merchandise_amt, |

|  |  |  | tax_base_, ge_tax_base |
|---|---|---|---|
| USE TAX AMT | Number |  | tax_accrued |
| TAX PAID | Number |  | tax_paid |
| STRATUM | Text |  | stratum |
| POST PER | Text |  | post_period |
| GE TAX STATUS | Text |  | ge_tax_status |
| VOUCHER LINE NUM | Text |  | voucher_line_item_num |
| LINE ITEM QTY | Number |  | line_item_qty |
| BUYER CODE | Text |  | buyer_code |
| SPSC COMMOD CODE | Text |  | spsc_commodity_code |
| TAX INDICATOR | Text |  | tax_indicator |
| DEPARTMENT CODE | Text |  | department_code |
| SITE CODE | Text |  | site_code |
| REQUESTER | Text |  | requestor |
| CONTRACT CODE | Text |  | contract_code |
| ERROR TYPE | Text |  | error_type |
| TAX RATE | Number |  | tax_rate, ge_tax_rate |
|  |  |  |  |

FIG. 17B

| Reference | CBI | Vendor Name | Voucher | Jurisdiction Status | Voucher Desc | Jurisdiction Comments | Image |
|---|---|---|---|---|---|---|---|
| Merch. Amt | Tax Ind | Tax Base | Tax Rate | Status | Projected Tax | Comments | Acct Number |
| 1 | NBC | SUN CIRCUIT | ACQ3KJ | No Issue | ANALOG PWB PATT B | | |
| $1,615.00 | T | -$1,615.00 | 5 | No Issue | -$5,773,625 | Comts-12345 | 0621129 |
| 2 | NBC | MASON JUDI | 479599 | No Issue | | | |
| -$3,344.66 | T | -$3,344.66 | 5 | No Issue | -$11,957,159 | Comts-12345 | 5295047 |
| 3 | NBC | VWR SCIENT | 480049 | No Issue | FURNACE LABORATO | | |

Total-Merch. Amount: -$3,654,179.57   Projected Tax: -$12,914,191,004.00   517 record(s) retrieved.
Filter-Merch. Amount: $0.00   Projected Tax: $0.00   0 record(s) retrieved.

Reference Number [   ] [Go] [Previous>200] [Next>200] [Email/Mess.] [Logout]

[Refresh] [Change Audit] [Filter] [Save] [Extract]

Form Details

- Reference Number: 3
- Voucher: 480049
- Vendor: NBC — 584
- Purchase Order: 93Y095
- PO Line
- Voucher Line
- Line Qty 588 — Vendor: VWR

Form Details

| Field | Value |
|---|---|
| Invoice Number | 46819960 |
| Account Number | 52050 4096 |
| Account Desc | |
| Cost Center Desc | MATERIALS TECH |
| Voucher Desc | FURNACE, LAB |
| Check Desc | |
| Ship To Zip | |
| Discount Amt | |
| Taxable Amt | |
| Inv Date | 4/5/93 |
| Sub Acct Number | |
| Post Period | 9304 |
| Cost Center | 1212 |
| Buyer Code | |
| Check Num | |
| Requestor | |
| Merch Amt | -$510.00 |
| Tax Paid | -$42.08 |
| Check Date | |
| Agree Date | |
| Project Code | 00000 |
| Progress Ind | |
| Tax Indicator | T |
| Site Code | |
| FOB Code | |
| SPSC Code | |
| Contract Code | |
| Freight Amt | |
| Tax Accrued | |
| Gross Amt | |
| Net Paid | |
| Tax Base | -$510.00 |
| Tax Rate | 5 |

Comments: Comts---12345>

Status: No Issue
Auditor Status: No Issue

Jurisdiction Comments

Business Comments

Multi View | View Image | Save | Prev Record | Next Record | Logout

Refresh 581, 640, 606, 598, 596, 600, 592, 602, 582, 594, 586, 590, 642

3:19 PM

Header Columns
- ☐ Audit Id
- ☐ Net Amt Paid
- ☐ Inv Taxable Amt
- ☐ Progress Ind
- ☐ Contract Name
- ☐ All Header Columns
- ☐ Inv Number
- ☐ Freight Amt
- ☐ Discount Amt
- ☐ Check Num
- ☐ Vendor Phone
- ☐ Invoice Date
- ☐ Gross Amt
- ☐ Check Descr
- ☐ Vendor Name
- ☐ Business
- ☐ Vendor Number
- ☐ Tax Amt
- ☐ Check Date
- ☐ FOB Code
- ☐ PO Number
- ☐ Tax Paid
- ☐ Ship To Zip
- ☐ Type Code

Detail Columns
- ☐ Acct Number
- ☐ Corp Bus Code
- ☐ Merchandise Amt
- ☐ Jurisdic Comments
- ☐ Business Comts
- ☐ Vouch Ln Itm Num
- ☐ Tax Indicator
- ☐ Invoice Freight Amt
- ☐ Auditor Mod Date
- ☐ Aud Flip Flop Cnter
- ☐ All Detail Columns
- ☐ Sub Acct Number
- ☐ Voucher Number
- ☐ PO Ln Item Num
- ☐ Reference Num
- ☐ Analyst Comts
- ☐ Tax Base
- ☐ Tax Paid
- ☐ Department Code
- ☐ Modified Date
- ☐ Flip Flop Counter
- ☐ Cost Center Code
- ☐ Voucher Desc
- ☐ Use Tax Code
- ☐ Post Period
- ☐ Comments
- ☐ Tax Rate
- ☐ Line Item Qty
- ☐ Site Code
- ☐ Contract Code
- ☐ Cost Ctr Desc
- ☐ Project Code
- ☐ Tax Accrued
- ☐ Auditor Status
- ☐ Agree Date
- ☐ Tax Base
- ☐ Buyer Code
- ☐ Requestor
- ☐ Error Type
- ☐ Acct Desc
- ☐ Glid
- ☐ Stratum
- ☐ Verify
- ☐ Tax Status
- ☐ Tax Rate
- ☐ SPSC Code
- ☐

Enter valid file name with extension xls. [_____] Path = P:\USER\TX\EXAMS

[Submit]  [Multi View]

FIG. 22

Report Criteria — 722

Select Group By Column:

Account Number
Commodity Code
Contact Name
Corporate Business Code
Cost Center
Error Type
Status
General Ledger Id
Jurisdiction Status
Post Period
Project Contact Job
Purchase Order Number
Stratum
Vendor Name
Voucher Number

[Submit]  [Select Audit]  [Logout]

| Reference | CBI | Voucher Desc | Projected Tax | Vendor Name | Account Desc | Jurisdiction Comments | Business Comments | Image | Acct Number |
|---|---|---|---|---|---|---|---|---|---|
| 1 | NBC | ANALOG PWB PATT | -$5,773,625 | ACQ3KJ | SUN CIRCUIT | | | | 062112900 |
| 2 | NBC | 479599 | -$11,957,159 | | FIN PROD-DM S&RP | business comments.......... | | | |
| 3 | NBC | | -$3,344.66 | | FURNACE LAB | MASON JUDI | testing | | 529504701 |
| | | | | | VWR SCIENT | | | | |

Total-Merch. Amount: -$3,654,179.57  Projected Tax: -$12,914,191,004.00  517 record(s) retrieved.
Filter-Merch. Amount: $0.00  Projected Tax: $0.00  0 record(s) retrieved.

Reference Number [    ] [Go] [Previous>200] [Next>200]

[Refresh] [Change Audit] [Filter] [Save] [Extract] [Logout]

FIG. 27

Report Criteria — 942

Select Group By Column:

Account Number
Commodity Code
Contact Name
Corporate Business Code
Cost Center
Error Type
Status
General Ledger Id
Jurisdiction Status
Post Period
Project Contact Job
Purchase Order Number
Stratum
Vendor Name
Voucher Number Submit   Select Audit   Logout

FIG. 30

| Company | Jurisdiction | Sample Description | Audit Period |
|---|---|---|---|
| PARENT CO CONSOL | FLORIDA | PURCHASE SAMPLE | 1/1/93 - 1/1/98 |

| Stratum | Merchandise Amount | Tax Base | Projected Tax | #Records |
|---|---|---|---|---|
| S1 | $3,618,103.99 | $3,618,103.99 | $3,009,430.31 | 450 |
| S2 | $30,904.72 | $30,904.72 | $646,760.65 | 300 |
| S3 | $393,850.30 | $393,850.30 | $7,860,640.72 | 300 |
| S4 | $2,802,025.00 | $2,802,025.00 | $10,556,550.72 | 300 |
| S5 | $12,726,724.63 | $12,726,724.63 | $18,134,513.33 | 300 |
| S6 | $45,223,269.13 | $45,223,269.13 | $17,711,540.92 | 300 |
| S7 | $360,441,954.93 | $360,441,954.93 | $25,455,221.64 | 527 |
| Total | $418,000,624.71 | $418,000,624.71 | $77,355,797.67 | 2,477 |

Report Selection    Select Audit

FIG. 31

Table: T IA USER
This table has all user id's, name, email & type (Analyst / Auditor).

| Column_name   | Type    | Length |
|---------------|---------|--------|
| gessouid      | varchar | 40     |
| user_id       | varchar | 30     |
| first_name    | varchar | 30     |
| last_name     | varchar | 30     |
| email_address | varchar | 50     |
| type          | varchar | 10     |

FIG. 32

Table: T IA AUDIT
This table has audit information.

| Column_name        | Type     | Length |
|--------------------|----------|--------|
| audit_id           | int      | 4      |
| legal_entity       | varchar  | 50     |
| jurisdiction       | varchar  | 50     |
| business           | varchar  | 50     |
| business_desc      | varchar  | 50     |
| audit_from         | datetime | 8      |
| audit_to           | datetime | 8      |
| estimated_tax_rate | decimal  | 5      |
| sample_type        | varchar  | 20     |

FIG. 33

Table: T IA USER AUDIT
This table has the information of which user has access to which audits.

| Column_name | Type | Length |
|---|---|---|
| gessouid | varchar | 40 |
| audit_id | int | 4 |

FIG. 34

Table: T IA ERROR TYPE
This table has error type codes & description. These codes are used in T_IA_SAMPLE_DTL table.

| Column_name | Type | Length |
|---|---|---|
| error_type_code | varchar | 2 |
| error_type_desc | varchar | 50 |

FIG. 35

Table: T IA BASE PROJECTION
This table has base projection details for sample audit.

| Column_name | Type | Length |
| --- | --- | --- |
| audit_id | int | 4 |
| stratum | varchar | 2 |
| sample_amt | money | 8 |
| population_amt | money | 8 |
| sample_count | int | 4 |
| population_count | int | 4 |

FIG. 36

Table: T IA SAMPLE HDR
This table has header information of sample audit.

| Column_name | Type | Length |
| --- | --- | --- |
| vendor_remit_name | varchar | 30 |
| invoice_num | varchar | 20 |
| invoice_date | datetime | 8 |
| po_num | varchar | 20 |
| freight_amt | money | 8 |
| tax_paid | money | 8 |
| check_date | datetime | 8 |
| gross_amt | money | 8 |
| net_amt_paid | money | 8 |
| discount_amt | money | 8 |
| tax_amt | money | 8 |
| check_desc | varchar | 50 |
| vendor_num | varchar | 10 |
| invoice_taxable_amt | money | 8 |
| progress_ind | varchar | 1 |
| fob_code | varchar | 1 |
| type_code | varchar | 1 |
| check_num | varchar | 20 |
| ship_to_zip | varchar | 10 |
| contact_first_name | varchar | 20 |
| contact_last_name | varchar | 20 |
| vendor_phone | varchar | 20 |
| business | varchar | 25 |
| audit_id | int | 4 |
| hdr_id | int | 4 |

FIG. 37

Table: T IA SAMPLE DTL
This table has detail information of sample audit.

| Column_name | Type | Length |
| --- | --- | --- |
| account_num | varchar | 50 |
| sub_account_num | varchar | 15 |
| account_desc | varchar | 50 |
| cost_center_desc | varchar | 50 |
| cost_center_office_code | varchar | 10 |
| project_contract_job | varchar | 30 |
| general_ledger_id | varchar | 2 |
| corp_business_code | varchar | 10 |
| voucher_num | varchar | 10 |
| voucher_desc | varchar | 255 |
| po_line_item_num | varchar | 6 |
| merchandise_amt | money | 8 |
| use_tax_code | varchar | 10 |
| tax_accrued | money | 8 |
| stratum | varchar | 2 |
| reference_num | int | 4 |
| post_period | varchar | 6 |
| jurisdiction_status | varchar | 2 |
| verify | varchar | 1 |
| jurisdiction_comments | text | 16 |
| ge_comments | text | 16 |
| analyst_comments | text | 16 |
| ge_business_comments | text | 16 |
| agree_date | datetime | 8 |
| ge_tax_status | varchar | 2 |
| voucher_line_item_num | varchar | 6 |
| tax_base | money | 8 |
| tax_rate | decimal | 5 |
| ge_tax_base | money | 8 |
| ge_tax_rate | decimal | 5 |
| cbi | varchar | 3 |
| line_item_qty | money | 8 |

| | | |
|---|---|---|
| buyer_code | varchar | 10 |
| spsc_commodity_code | varchar | 10 |
| tax_indicator | varchar | 1 |
| department_code | varchar | 6 |
| tax_paid | money | 8 |
| freight_amt | money | 8 |
| site_code | varchar | 6 |
| requestor | varchar | 25 |
| contract_code | varchar | 3 |
| audit_id | int | 4 |
| hdr_id | int | 4 |
| juris_last_modified_date | datetime | 8 |
| ge_last_modified_date | datetime | 8 |
| error_type | varchar | 2 |
| juris_flip_flop_counter | int | 4 |
| ge_flip_flop_counter | int | 4 |

FIG. 38B

Table: T IA QUESTIONS
This table stores questions/responses asked/replied by auditor/analyst.

| Column_name | Type | Length |
|---|---|---|
| question_id | int | 4 |
| from_user | varchar | 30 |
| to_user | varchar | 30 |
| subject | varchar | 100 |
| question | text | 16 |
| response | text | 16 |
| question_date | dateline | 8 |
| response_date | dateline | 8 |
| status | varchar | 15 |

FIG. 39

Table: T IA LEGAL ENTITY
This table has legal entity codes & description.

| Column_name | Type | Length |
|---|---|---|
| legal_entity_desc | varchar | 50 |

FIG. 40

Table: T_IA_TIME_RECORDER
This table has time in & out information of user.

| Column_name | Type | Length |
|---|---|---|
| record_id | int | 4 |
| user_id | varchar | 30 |
| audit_id | int | 4 |
| login_datetime | datetime | 8 |
| logout_datetime | datetime | 8 |

FIG. 41

METHODS AND SYSTEMS FOR MANAGING TAX AUDIT INFORMATION

BACKGROUND OF THE INVENTION

This invention relates generally to tax audits and, more particularly, to network-based methods and systems for managing tax audit information.

At least some known business entities are required by law to remit use tax money that has been collected by the business entity to an appropriate taxing jurisdiction. These business entities may also be required to maintain certain information relating to the taxes paid to assist the business if audited by the taxing jurisdiction. The information the business entity is required to maintain is known as tax audit (TA) information, and it may include at least business information, amounts remitted to the taxing jurisdictions by the business entity, invoices, exemption certificates, and any other documents or information relating to use taxes involving taxing jurisdictions and the business entity. Historically, such information has been maintained in paper form. For business entities that have numerous facilities in various taxing jurisdictions, maintaining such information can be difficult and costly.

When audited, a business entity may be required to provide the auditor from the taxing jurisdiction with TA information. This might require the business entity to send numerous boxes of TA information files to the auditor for review, or might require the auditor to travel to the business entity to conduct the review. The auditor will typically review the TA information, including the amounts paid to the taxing jurisdiction along with the supporting documentation, to determine whether the business entity has paid the correct amount to the taxing jurisdiction, underpaid the taxing jurisdiction, overpaid the taxing jurisdiction, or whether the records are incomplete. During the auditor's review of the TA information, the auditor might also make handwritten comments on the TA information provided by the business entity. For example, the auditor may indicate on the TA information that additional information is needed from the business entity to further evaluate the transaction, or the auditor may request an explanation as to why taxes were or were not paid. The TA information is then returned to the business entity to enable the business entity to respond to the auditor's comments and/or findings.

For business entities having numerous facilities located in multiple divisions worldwide, managing TA information, providing TA information to multiple auditors within multiple taxing jurisdictions, reviewing comments and findings from these auditors on multiple business transactions conducted throughout the world, responding to those comments and findings, confirming that the proper amount of tax has been remitted to the proper taxing jurisdictions, and confirming that the business entity is in compliance with applicable tax laws and regulations and/or internal business standards and policies, may be a formidable task.

BRIEF DESCRIPTION OF THE INVENTION

In one aspect, a method for managing tax audit (TA) information for a business entity using a server system is provided. The server system is coupled to a centralized database and at least one client system. The method includes receiving at the server system TA information from the client system, storing TA information received at the server system in the centralized database, tracking TA information stored in the centralized database, updating the centralized database periodically with newly received TA information to maintain TA information, and providing TA information in response to an inquiry.

In another aspect, a method for managing tax audit (TA) information using a web-based system is provided. The system employs a server system coupled to a centralized database and at least one client system. The TA information includes at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction. The method includes receiving at the server system TA information from a user through the client system, storing TA information received at the server system in the centralized database, and tracking TA information including compiling data reports, exporting TA information, and linking documents to a business transaction within an audit sample. The method also includes updating the centralized database with TA information including adding and deleting information to revise existing TA information, and providing TA information in response to an inquiry, including downloading requested information from the server system and displaying requested information on the client system, the inquiry including utilizing at least one pull-down lists, check boxes, and hypertext links. The method also includes notifying a user through an electronic message of the results of an audit, including comments and findings relating to the review of the TA information, and providing a report of the audit results by transmitting an electronic report to the managerial user system, which includes a summary of the review of TA information, and an auditor's comments and findings such that managerial oversight of the TA information is facilitated and compliance with tax laws, rules, regulations, standards, and policies is assured.

In another aspect, a network based system for managing tax audit (TA) information is provided. The system includes a client system having a browser, a centralized database for storing information, and a server system configured to be coupled to the client system and the database. The server system is further configured to receive TA information from the client system, store TA information in the centralized database, track TA information, update the centralized database periodically with newly received TA information to maintain TA information, provide TA information in response to an inquiry by a user, and notify users electronically of a review of the TA information by an auditor, including the auditor's comments and findings relating to the review of the TA information.

In another aspect, a computer program embodied on a computer readable medium for managing tax audit (TA) information is provided. The TA information includes at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction. The program includes a code segment that receives TA information and then maintains a database by adding, deleting and updating TA information. The code segment also provides users with access to TA information, generates data reports based on TA information, and compiles data reports that include at least one of the reference number, the merchandise amount, the vendor name, the tax base, the voucher number, the tax rate, the business entity status, the jurisdiction/auditor status, the voucher description, the account description, comments, jurisdiction comments, the document image, and the account number. The code segment also compiles data reports that include a selected subset of at least one of the reference number, the merchandise amount, the vendor name, the tax base, the voucher number, the tax rate, the business entity status, the jurisdiction/auditor status, the voucher description, the account description, comments, jurisdiction comments, the document image, and the account number, and exports TA information selected by a user to a spreadsheet computer program for review. The code segment also links at least one of invoices, exemption certificates, and other documents relating to use taxes paid to a taxing jurisdiction to a business transaction within an audit sample, notifies a user of a review of TA information by an auditor, and provides a report comprising a summary of the review of TA information, including the auditor's comments and findings.

BRIEF DESCRIPTION OF THE DRAWINGS

FIGS. 4A and 4B show a flowchart illustrating example processes utilized by a TACS.

FIG. 5 is an example embodiment of a user interface displaying a home page of a TACS.

FIG. 8 is an example embodiment of a user interface of a TACS displaying a data page for an audit sample selected by an auditor.

FIG. 12 is an example embodiment of a user interface of a TACS displaying a screen that relates to loading data into TACS by an analyst.

FIGS. 17A and 17B show an example embodiment of a user interface of a TACS displaying a table of data loaded into TACS by an analyst.

FIG. 19 is an example embodiment of a user interface of a TACS displaying a data page for an audit sample selected by an analyst.

FIG. 20 is an example embodiment of a user interface of a TACS displaying a data page for an audit sample selected by an analyst.

FIG. 22 is an example embodiment of a user interface of a TACS displaying a screen that an analyst can select from to extract data to a spreadsheet program.

FIG. 23 is an example embodiment of a user interface of a TACS displaying report criteria for an analyst.

FIG. 26 is an example embodiment of a user interface of a TACS displaying a data page for an audit sample selected by a business user.

FIG. 27 is an example embodiment of a user interface of a TACS displaying a data page for an audit sample selected by a business user.

FIG. 30 is an example embodiment of a user interface of a TACS displaying a report page for an audit sample selected by a business user.

FIG. 31 is an example embodiment of a user interface of a TACS displaying a report page for an audit sample selected by a business user.

FIG. 32 is a listing of data tables and key fields used by a TACS.

FIG. 33 is an alternative listing of additional example data tables and key fields used by a TACS.

FIG. 34 is an alternative listing of additional example data tables and key fields used by a TACS.

FIG. 35 is an alternative listing of additional example data tables and key fields used by a TACS.

FIG. 36 is an alternative listing of additional example data tables and key fields used by a TACS.

FIG. 37 is an alternative listing of additional example data tables and key fields used by a TACS.

FIGS. 38A and 38B show an alternative listing of additional example data tables and key fields used by a TACS.

FIG. 39 is an alternative listing of additional example data tables and key fields used by a TACS.

FIG. 40 is an alternative listing of additional example data tables and key fields used by a TACS.

FIG. 41 is an alternative listing of additional example data tables and key fields used by a TACS.

DETAILED DESCRIPTION OF THE INVENTION

Figure 1:
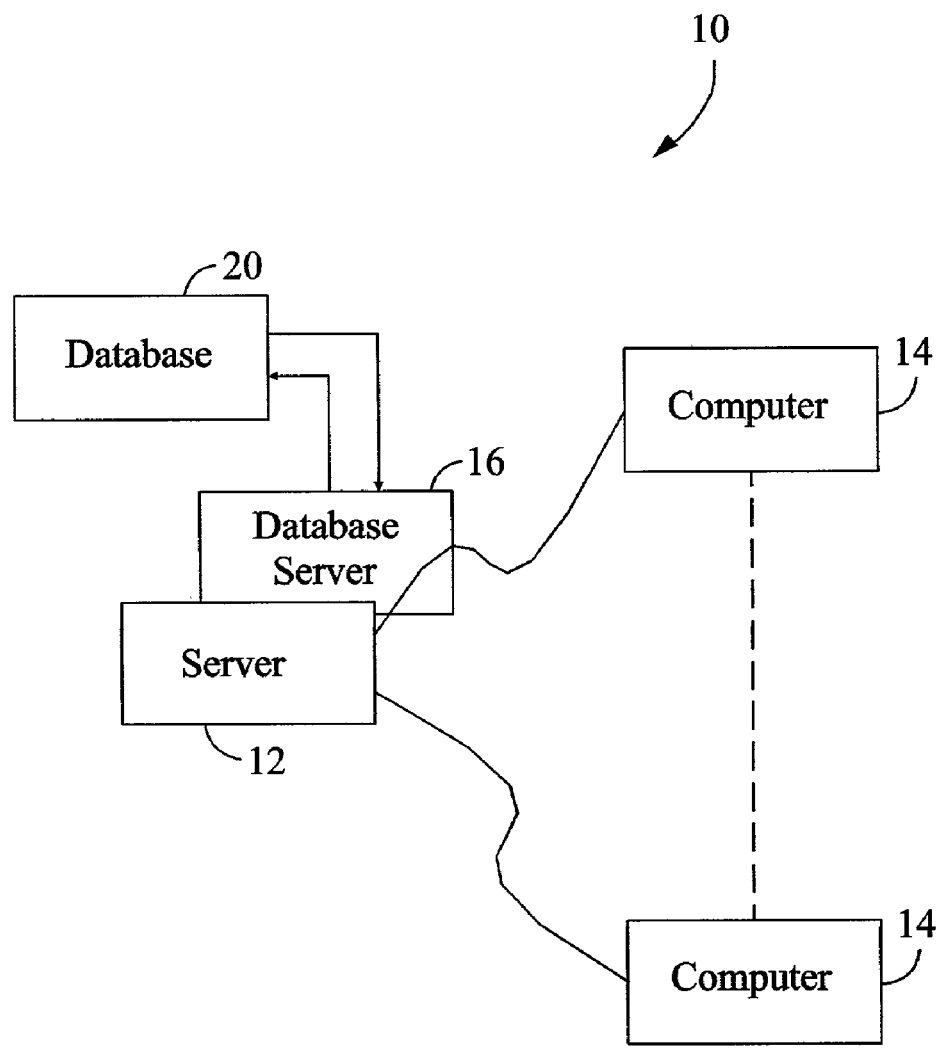
FIG. 1 is a simplified block diagram of a Tax Audit Coordination System (TACS) in accordance with one embodiment of the present invention.

Example embodiments of systems and processes that facilitate integrated network-based electronic reporting and workflow process management related to a Tax Audit Coordination System (TACS) are described below in detail. The systems and processes facilitate, for example, electronic submission of information using a client system, automated extraction of information, and web-based reporting for internal and external system users. The TACS permits a business entity to manage and provide financial data to outside auditors from a taxing jurisdiction to assure its compliance with federal, state, and local tax laws, rules, regulations, standards, and policies.

In the example embodiment, the TACS is utilized to collect, track, display, and disseminate real time information regarding Tax Audit (TA) information for a business entity. TA information includes at least one of business information, amount remitted to taxing jurisdiction, invoices, exemption certificates, and any other documents or information relating to use taxes paid to a taxing jurisdiction. In addition, the TACS enables an outside tax auditor to review a taxable transaction relating to the business entity and indicate whether the transaction is correct, resulted in an overpayment of taxes, an underpayment of taxes, or whether the correctness of the transaction is undetermined. The TACS also permits a tax analyst for the business entity to input data for an audit sample, edit data for an existing audit sample, review the auditor's comments and findings, generate reports, and edit security for the TACS. Finally, the TACS enables a business user to review TA information, and the auditor's comments and findings.

TA information relating to a business entity is received by the TACS which stores the TA information in a database, updates the database with TA information received, tracks the TA information received, provides TA information in response to an inquiry, allows an outside auditor to review and comment on TA information, and provides a report to at least one analyst within the business entity relating to the review of TA information by the outside tax auditor.

In the TACS, TA information is stored in the database. The network based TACS provides convenient access to TA information, including at least one of a reference number, a merchandise amount, a vendor name, a tax base, a voucher number, a tax rate, a business entity status, a jurisdiction status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction for each facility within a business entity. A user must be authorized to gain access into the TACS. In the example embodiment, the user logs onto TACS as either an auditor for a taxing jurisdiction, an analyst for the business entity, or as a business user. Once the TACS home page is accessed, the user will be able to choose from a list of audit samples that the user has been given access to view TA information for the audit sample selected. In an example embodiment, only an authorized user can access the TA information.

In one embodiment, a computer program is provided, and the program is embodied on a computer readable medium and utilizes a Structured Query Language (SQL) with a client user interface front-end for administration and a web interface for standard user input and reports. In an example embodiment, the system is web enabled and is run on a business-entity intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of a Tax Audit Coordination System (TACS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
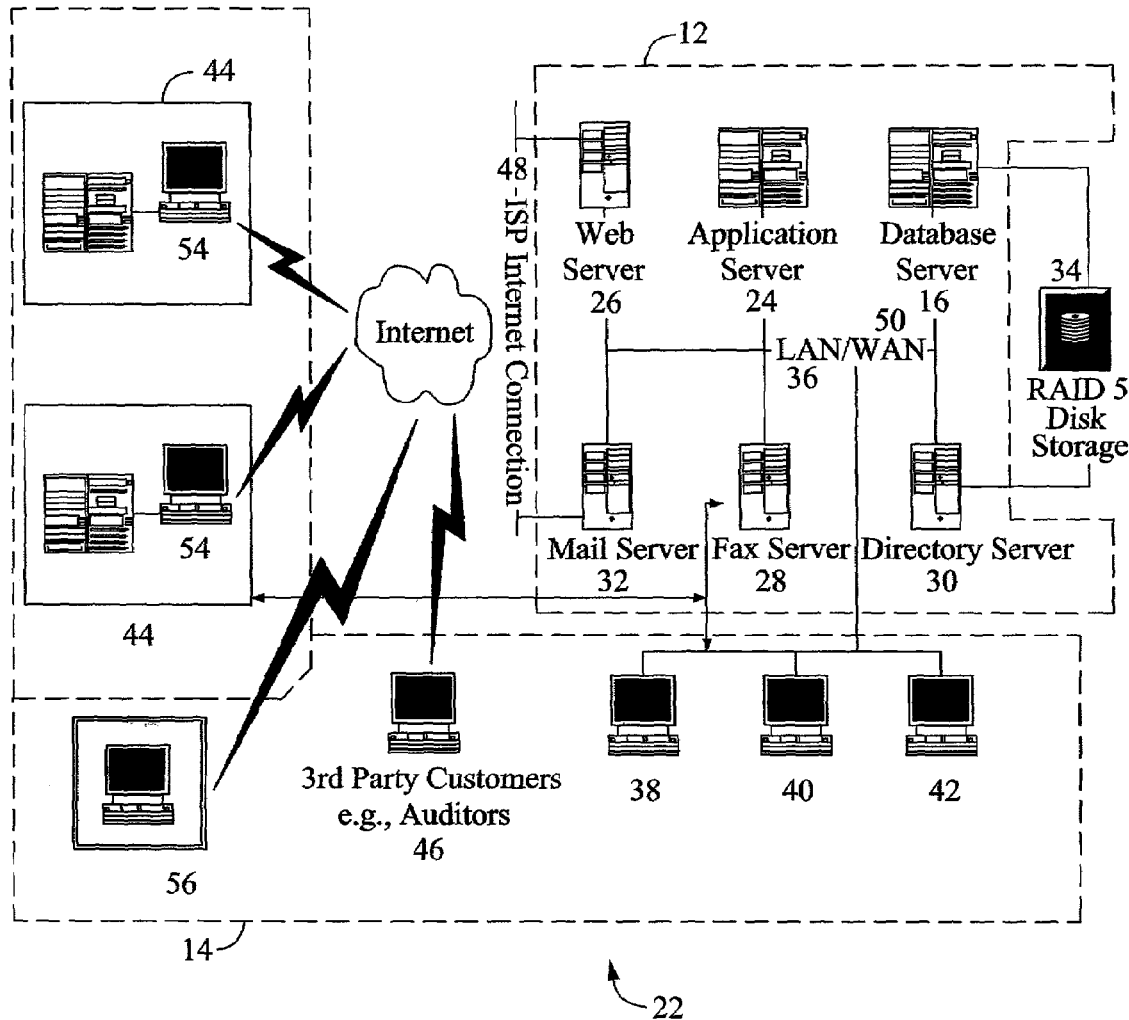
FIG. 2 is an expanded version block diagram of an example embodiment of a server architecture of the TACS.

FIG. 2 is an expanded block diagram of an example embodiment of a server architecture of a TACS 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36. In an example embodiment, client system 14 includes workstation 40 which can be used by an auditor, an analyst, or a business user to review TA information from the business entity.

Server system 12 is configured to be communicatively coupled to various individuals, including employees 44 and to third parties, e.g., auditors, analysts or business users, 46 via an ISP Internet connection 48. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the example embodiment, any authorized individual having a workstation 54 can access TACS 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 via a telephone link. Fax server 28 is configured to communicate with other client systems 38, 40, and 42 as well.

Figure 3:
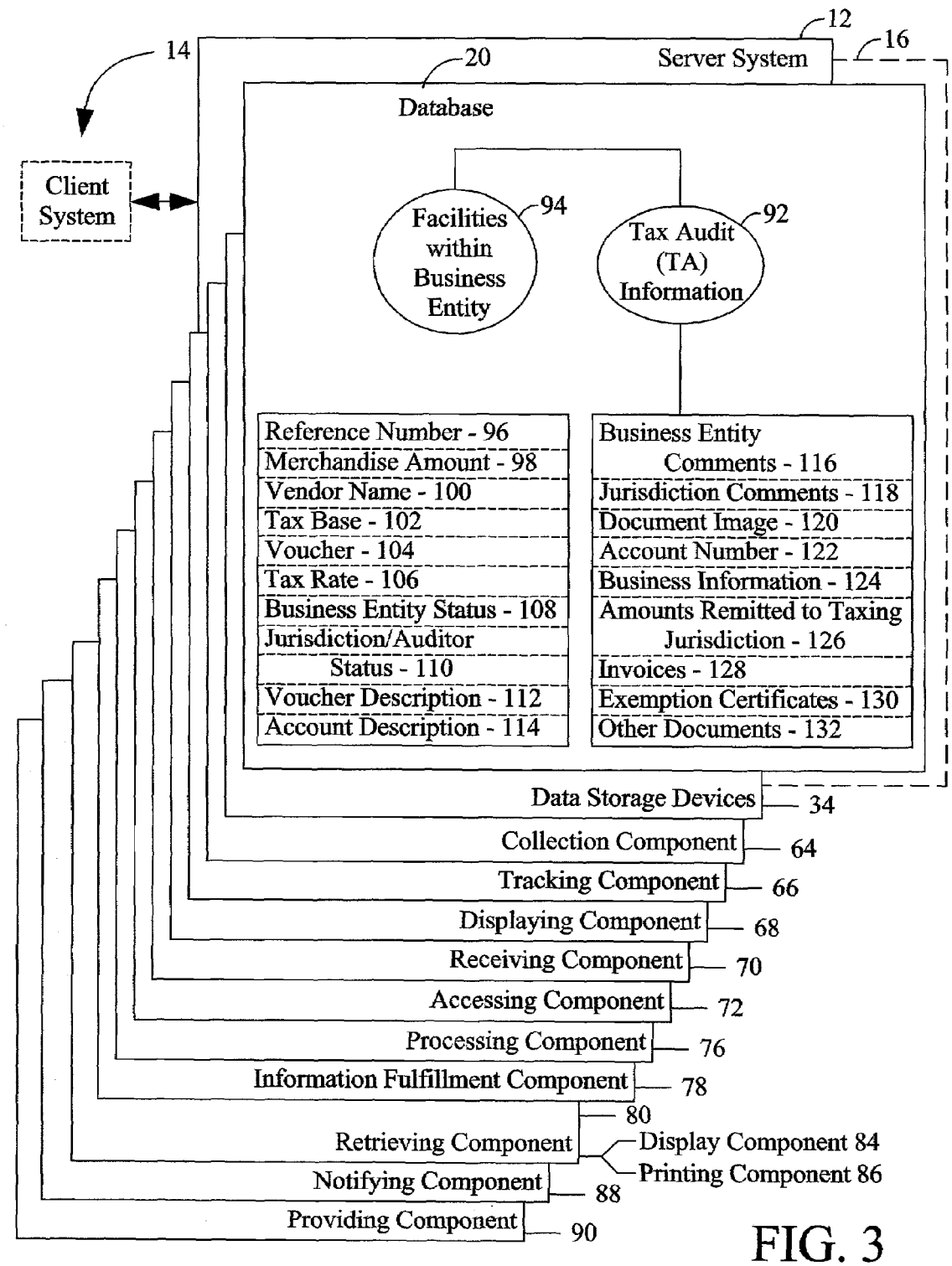
FIG. 3 illustrates an example configuration of a database within the database server of the server system including other related server components.

FIG. 3 illustrates an example configuration of database 20 within database server 16 of server system 12 shown in FIG. 1. Database 20 is coupled to several separate computer software components within server system 12 which perform specific tasks. In the example embodiment, server system 12 includes a collection component 64 for collecting data from users in database 20, a tracking component 66 for tracking data, and a displaying component 68 to display information. Tracking component 66 tracks and cross-references data, including modifying existing data.

Server system 12 also includes a receiving component 70 to receive a specific query from client system 14, and an accessing component 72 to access database 20 within data storage device 34. Receiving component 70 is programmed to receive a query from one of a plurality of users. Server system 12 further includes a processing component 76 for searching and processing received queries against database 20 containing a variety of information collected by collection component 64. An information fulfillment component 78, located in server system 12, enables the requested information to be downloaded to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 also includes a display component 84 that is configured to download information to be displayed on a client system's graphical user interface and a printing component 86 that is configured to print information. Retrieving component 80 generates reports requested by the user through client system 14 in a predetermined format. System 10 is flexible to provide other alternative types of reports and is not constrained to the options set forth above.

Server system 12 also includes a notifying component 88 and a providing component 90. Notifying component 88 electronically transmits a message to client system 14 based on information inputted into server system 12, notifying an analyst of a review of TA information by an auditor from a taxing jurisdiction, including the auditor's comments and findings. Providing component 90 electronically provides a report to manager workstation 56 (shown in FIG. 2) summarizing the review of the TA information by the auditor, including the auditor's comments and findings.

In one embodiment, collection component 64, tracking component 66, displaying component 68, receiving component 70, processing component 76, information fulfillment component 78, retrieving component 80, display component 84, printing component 86, notifying component 88, and providing component 90 are computer programs embodied on computer readable medium.

Database 20 stores Tax Audit (TA) information 92 for each facility 94 within a business entity. TA information 92 includes at least one of a reference number 96, a merchandise amount 98, a vendor name 100, a tax base 102, a voucher 104, a tax rate 106, a business entity status 108, a jurisdiction status 110, a voucher description 112, an account description 114, business entity comments 116, jurisdiction comments 118, a document image 120, an account number 122, business information 124, amounts remitted to taxing jurisdiction 126, invoices 128, exemption certificates 130, and other documents 132 relating to use taxes paid to a taxing jurisdiction.

System 10 accumulates a variety of confidential data and has different access levels to control and monitor the security of and access to system 10. Authorization for access is assigned by system administrators on a need to know basis. In one embodiment, access is provided based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are example only. Other architectures are possible and can be utilized in connection with practicing the processes described below.

Figure 4B:
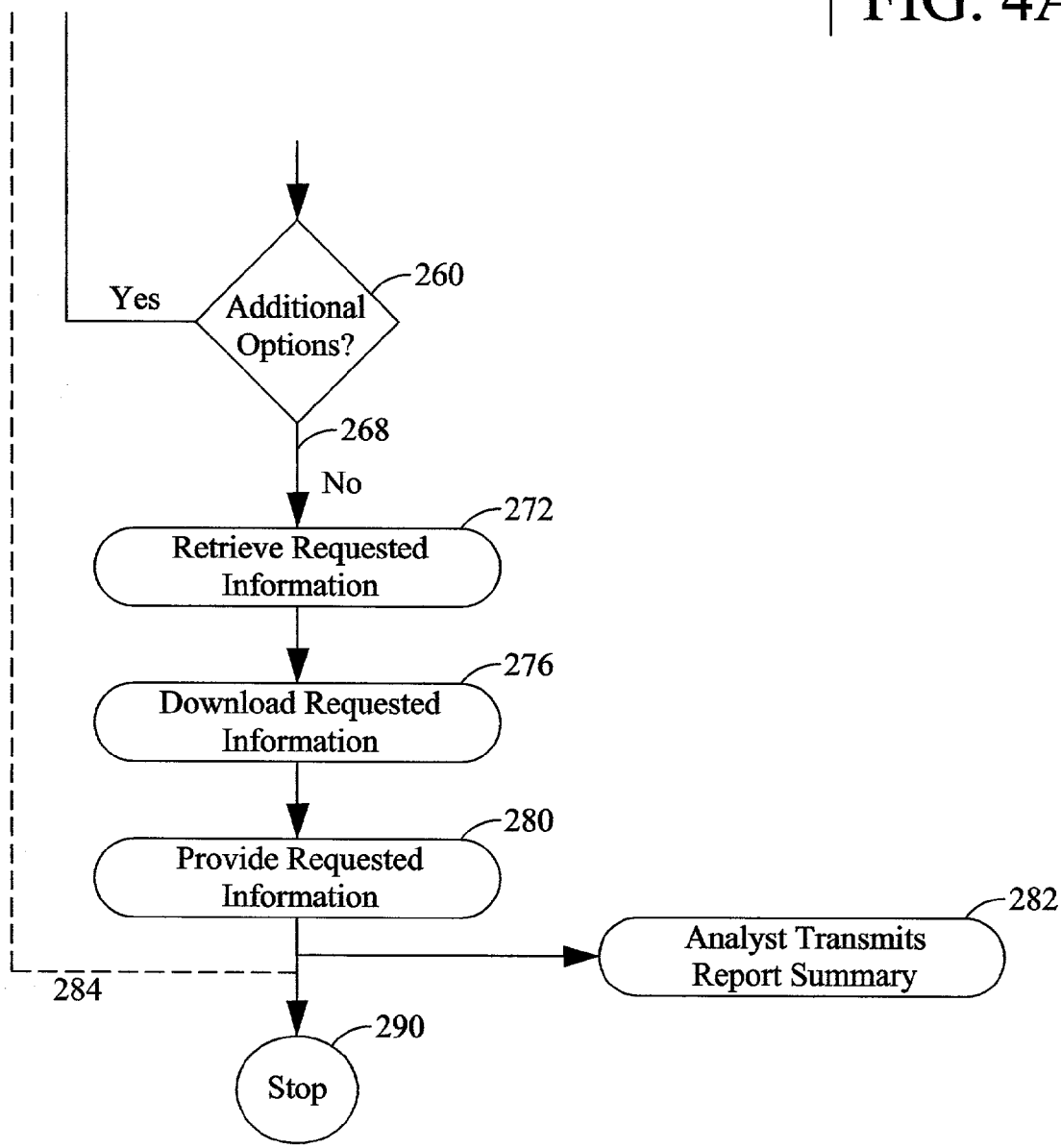

FIGS. 4A and 4B show a flowchart 200 illustrating example processes utilized by system 10. Initially, a user accesses 210 a user interface, such as a home page 220, of the web site through client system 14 (shown in FIG. 1). In one embodiment, client system 14, as well as server system 12, are protected from access by unauthorized individuals. The user logs-in 230 to system 10 using a password (not shown) or an employee payroll number for security. In the example embodiment, user access is based on whether the user is an auditor, an analyst, or a business user. Client system 14 is configured to receive 232 an electronic notice indicating to the analyst that a review of TA information by the auditor has occurred, and whether the auditor has any comments or made any findings relating to the review.

Client system 14 displays 240 options available to the user through links, check boxes, or pull-down lists. Once the user selects 244 an option (in one embodiment, relating to a facility within the business entity) from the available links, the request is transmitted 248 to server system 12. Transmitting 248 the request is accomplished, in one embodiment, either by click of a mouse or by a voice command. Once server system 12 (shown in FIG. 1) receives 252 the request, server system 12 accesses 256 database 20 (shown in FIG. 1). System 10 determines 260 if additional narrowing options are available. In one embodiment, additional narrowing options include tax related business transactions and supporting document selection pull-down lists. If additional narrowing options are available 264, system 10 displays 240 the options relating to the prior option selected by the user on client system 14. The user selects 244 the desired option and transmits the request 248. Server system 12 receives the request 252 and accesses 256 database 20. When system 10 determines that additional options 260 are not available 268, system 10 retrieves 272 requested information from database 20. The requested information is downloaded 276 and provided 280 to client system 14 from server 12. Client system 14 transmits a report 282, from the analyst to manager workstation 56 (shown in FIG. 2), which summarizes the auditor's review of the TA information, and includes the auditor's comments and findings. The user may continue to search 284 database 20 for other information or exit 290 from system 10.

FIG. 5 is an example embodiment of a user interface 300 displaying a home page of TACS 10 (shown in FIG. 1) after a user has logged onto TACS 10. User interface 300 welcomes the user to TACS 10 and provides the user with relevant background information relating to TACS 10. In an example embodiment, user interface 300 shows a "Yes-Continue" button 302 and a "NoLogout" button 304. Although buttons are illustrated in the example embodiment, pull-down lists, check boxes, and other means for inputting information could also be used. User interface 300 is the entry point to access database 20 (shown in FIG. 1) via the web. After selecting Yes-Continue button 302, the user is provided with a list of audit samples which the user has been given access to for review.

Figure 6:
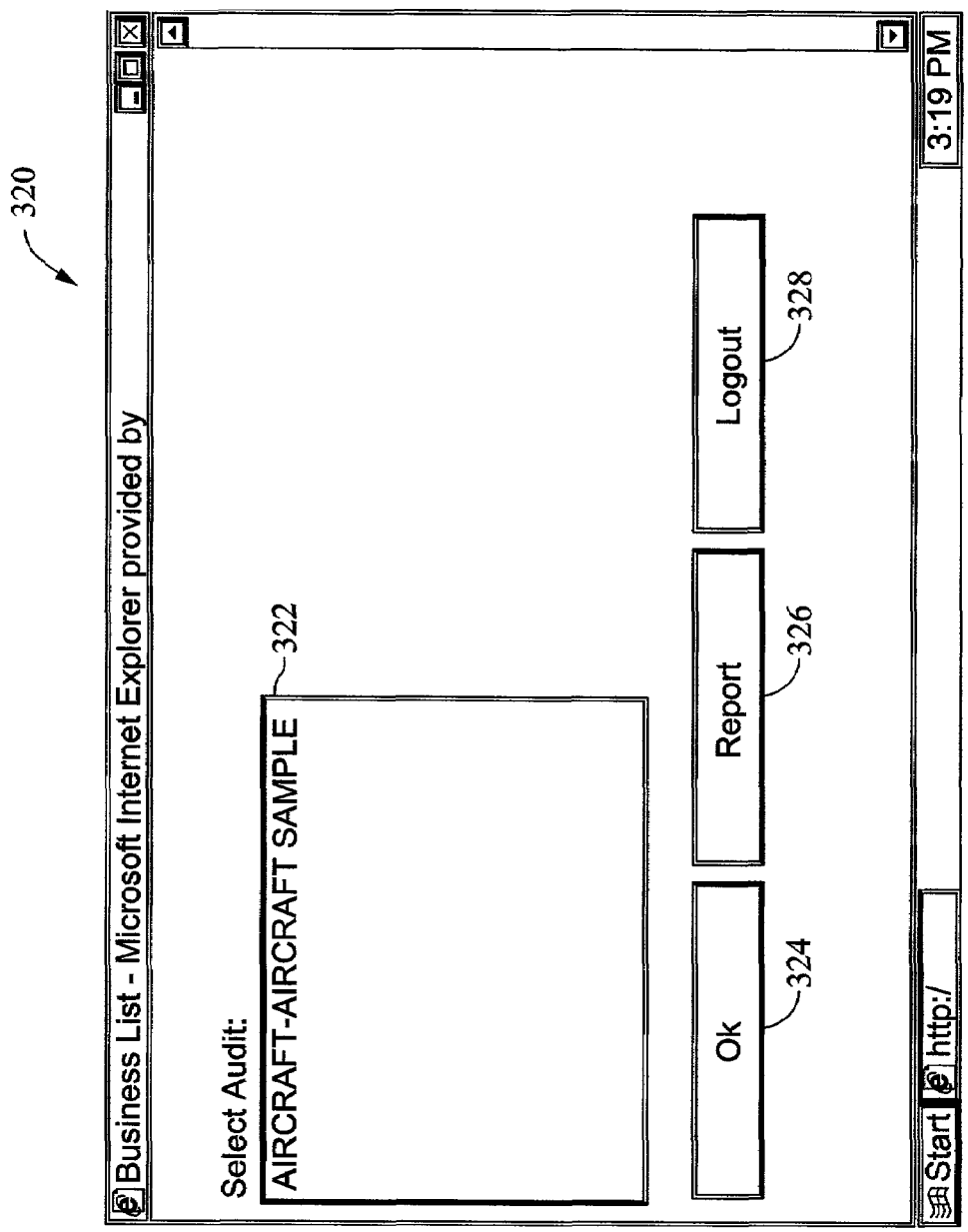
FIG. 6 is an example embodiment of a user interface of a TACS displaying a list of audit samples for review by an auditor.

FIG. 6 is an example embodiment of a user interface 320 that displays a list of audit samples 322 to which an auditor has been given access for review by the business entity. In the example embodiment, audit sample 322 is a corporate division within the business entity that the auditor has access to for review. In an alternative embodiment, audit sample 322 is a subsidiary, department, affiliate, or facility within a business entity. User interface 320 also displays an "OK" button 324, a "Report" button 326, and a "Logout" button 328. In the example embodiment, the auditor selects an audit sample 322 to be reviewed by highlighting it on the list. The auditor can then select OK button 324 or Report button 326.

Figure 7:
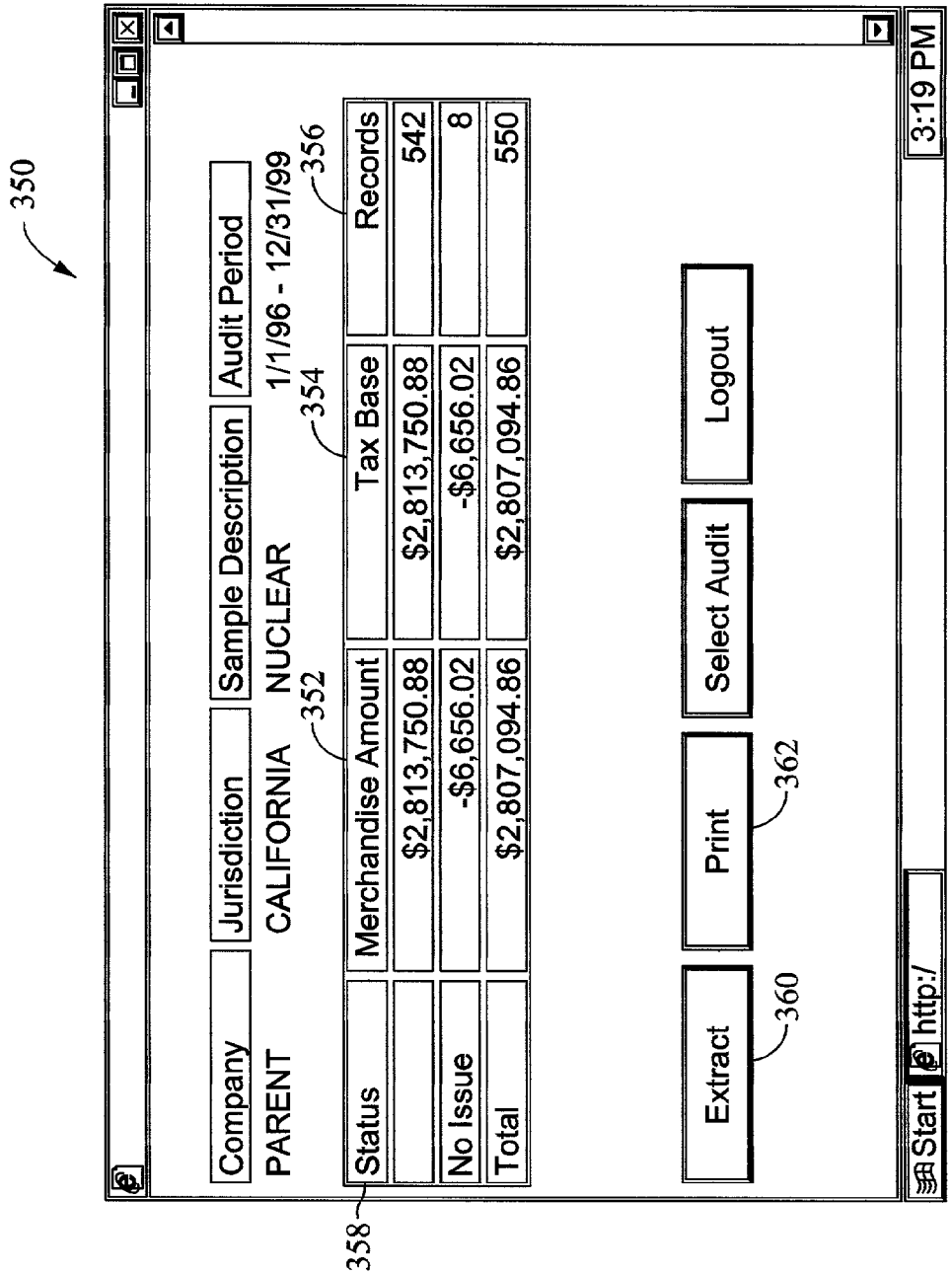
FIG. 7 is an example embodiment of a user interface of a TACS displaying a report page for an audit sample selected by an auditor.

FIG. 7 is an example embodiment of a user interface 350 that displays a reports page that provides a report after audit sample 322 and Report button 326 (shown in FIG. 6) have been selected. User interface 350 allows an auditor to generate reports, which illustrate summary control totals for Merchandise Amount 352, Tax Base 354, and Number of Records 356 subtotaled by Auditor Status 358 for selected audit sample 322. In addition to displaying totals on the screen, the auditor can extract a report by selecting an "Extract" button 360. Extract button 360 copies the report totals to a standard file name so that it can be further analyzed by the auditor. In the example embodiment, Extract button 360 allows the report to be reviewed in a spreadsheet program. In the example embodiment, the spreadsheet program is in an Excel™ format (Excel is a trademark of Microsoft Corporation, Redmond, Wash.). User interface 350 also provides a "Print" button 362 that allows the auditor to print a report. In the example embodiment, TACS 10 (shown in FIG. 1) can be configured such that, when an auditor selects Print button 362, the report is printed by a network printer located near an analyst for the business entity so that the analyst for the business entity can review the report prior to sending it to the auditor.

FIG. 8 is an example embodiment of a user interface 380 that displays a data page that is provided after audit sample 322 and OK button 324 (shown in FIG. 6) have been selected. User interface 380 displays TA information 92 (shown in FIG. 3) in tabular form and includes at least one of the following field headers: Reference Number 381, Merchandise Amount 382, Vendor Name 384, Tax Base 386, Voucher 388, Tax Rate 390, Business Entity Status 392, Jurisdiction Status 394, Voucher Description 396, Account Description 398, Comments 400, Jurisdiction Comments 402, Image 404, and Account Number 406. In the example embodiment, the data may be sorted by any one of the various fields. In the example embodiment, the auditor can edit fields: Tax Base 386, Tax Rate 390, Jurisdiction Status 394, and Jurisdiction Comments 402. Jurisdiction Status field 394 includes a drop down box that includes at least four options (not shown in FIG. 8) including No Issue, Overpayment, Research, and Underpayment.

User interface 380 also displays a Refresh button 408, a Change Audit button 410, a Filter button 412, and a Save button 414. In the example embodiment, Reference Number 381 allows a user to display and view a more detailed user interface that illustrates TA information 92 for the selected Reference Number. In addition, Image 404 is a link that when selected displays a corresponding invoice for the selected Reference Number. Change Audit button 410 returns the user to user interface 320, and Filter button 412 displays a Filter screen (shown in FIG. 10) to the user. User interface 380 also includes an Email Message button 416 which allows electronic messages to be sent.

Figure 9:
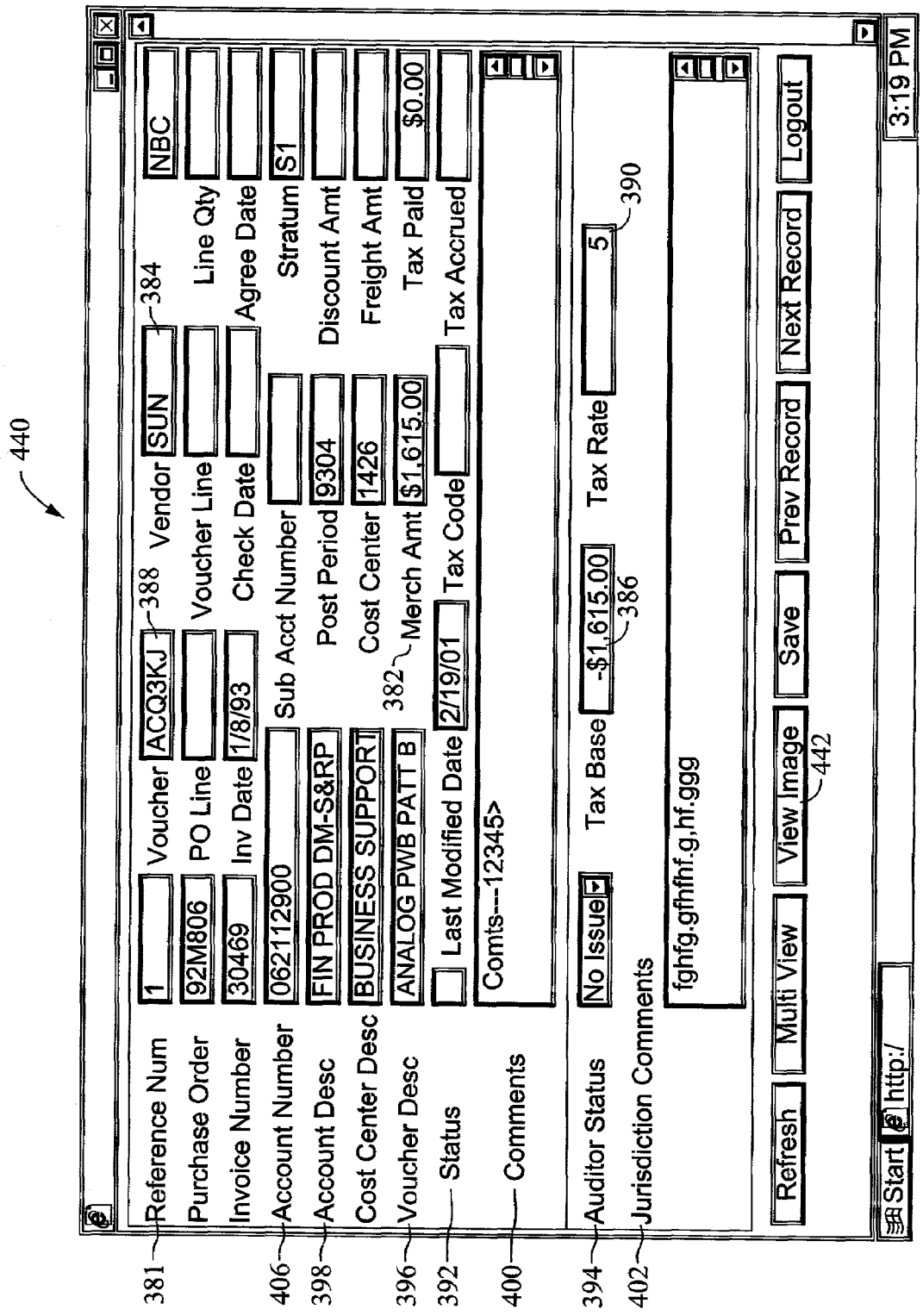
FIG. 9 is an example embodiment of a user interface of a TACS displaying a data page for an audit sample selected by an auditor.

FIG. 9 is an example embodiment of a user interface 440 that displays a data page that may be provided after Reference Number 381 link is selected from user interface 380 (shown in FIG. 8). User interface 440 displays TA information 92 (shown in FIG. 3) for a selected transaction in a table with at least one of the following field headers: Reference Number 381, Merchandise Amount 382, Vendor Name 384, Tax Base 386, Voucher 388, Tax Rate 390, Business Entity Status 392, Jurisdiction/Auditor Status 394, Voucher Description 396, Account Description 398, Comments 400, Jurisdiction Comments 402, and Account Number 406. In the example embodiment, user interface 440 also includes a button labeled View Image 442, which allows the user to view the corresponding invoice image. View Image button 442 has the same functionality as field header labeled Image 404 shown in FIG. 8. In the example embodiment, the auditor can edit fields: Tax Base 386, Tax Rate 390, Jurisdiction Status 394, and Jurisdiction Comments 402.

Figure 10:
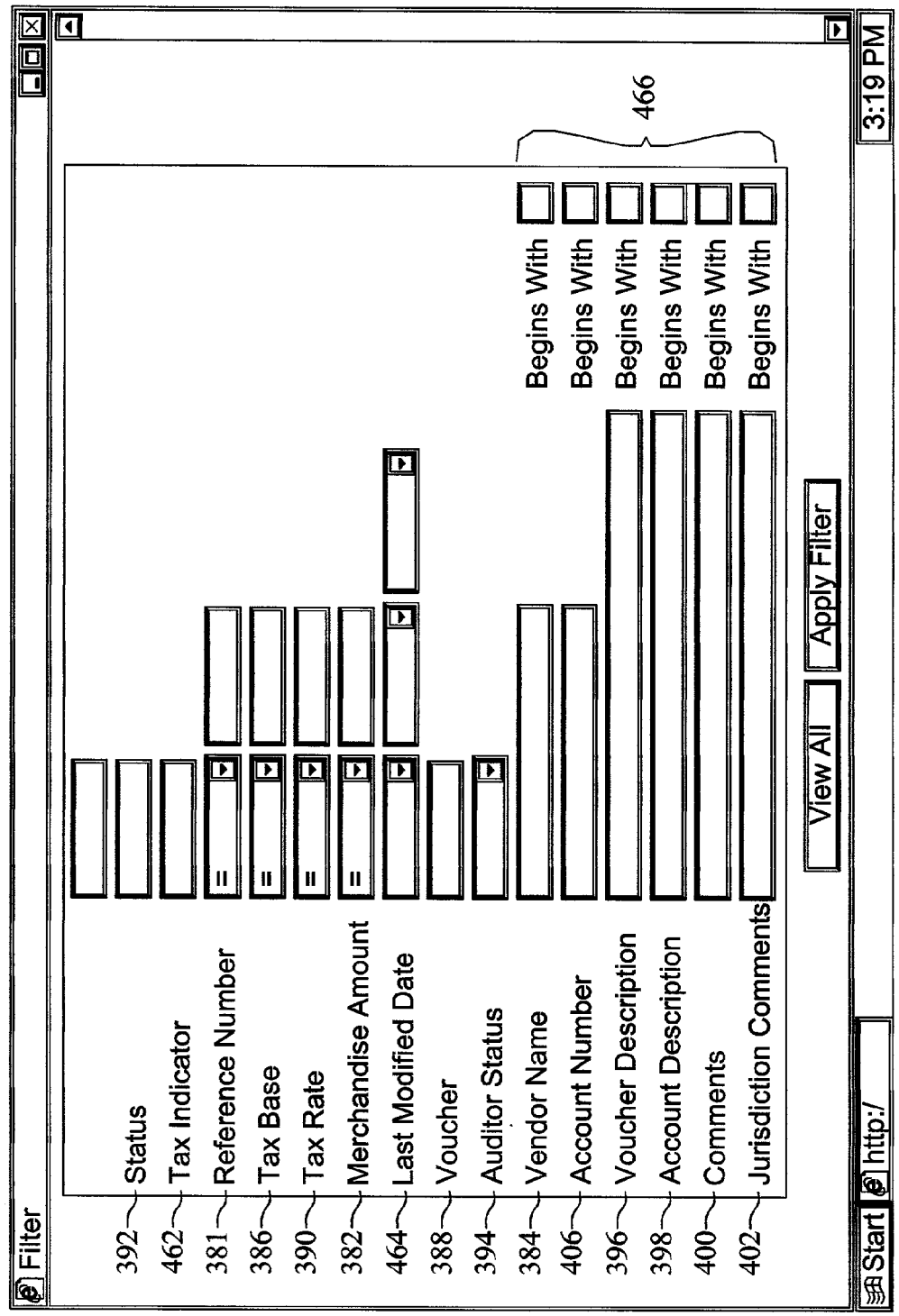
FIG. 10 is an example embodiment of a user interface of a TACS displaying a filter page that allows an auditor to view a selected subset of a selected audit sample.

FIG. 10 is an example embodiment of a user interface 460 that displays a screen that allows an auditor to view a selected subset of an audit sample. User interface 460 is accessed when the auditor selects Filter button 412 from user interface 380 (shown in FIG. 8). User interface 460 also includes at least one of the following field headers: Reference Number 381, Merchandise Amount 382, Vendor Name 384, Tax Base 386, Voucher 388, Tax Rate 390, Business Entity Status 392, Jurisdiction/Auditor Status 394, Voucher Description 396, Account Description 398, Comments 400, Jurisdiction Comments 402, and Account Number 406. In the example embodiment, user interface 460 also includes field headers labeled Tax Indicator 462 and Last Modified 464. In the example embodiment, the auditor can fill any field displayed with data to be used as a filter. Reference Number 381 and amount fields have drop down boxes (not shown in FIG. 10) for selecting "equal," "less than or equal to," or "greater than or equal to" options. Vendor Name 384, Account Number 406, Voucher Description 396, Comments 400, Jurisdiction Comments 402 fields have a "Begin With" option 466 which filters only on the string of data given and not the entire field.

In the example embodiment, when either Image 404 hyperlink (shown in FIG. 8) or View Image button 442 (shown in FIG. 9) is selected, data is loaded into TACS 10 (shown in FIG. 1) such that all available images of invoices that correspond to the transaction are linked. After the invoice is displayed, the auditor can zoom in or out on the image, can size the image to fit on the screen, and can invert the image on the screen.

Figure 11:
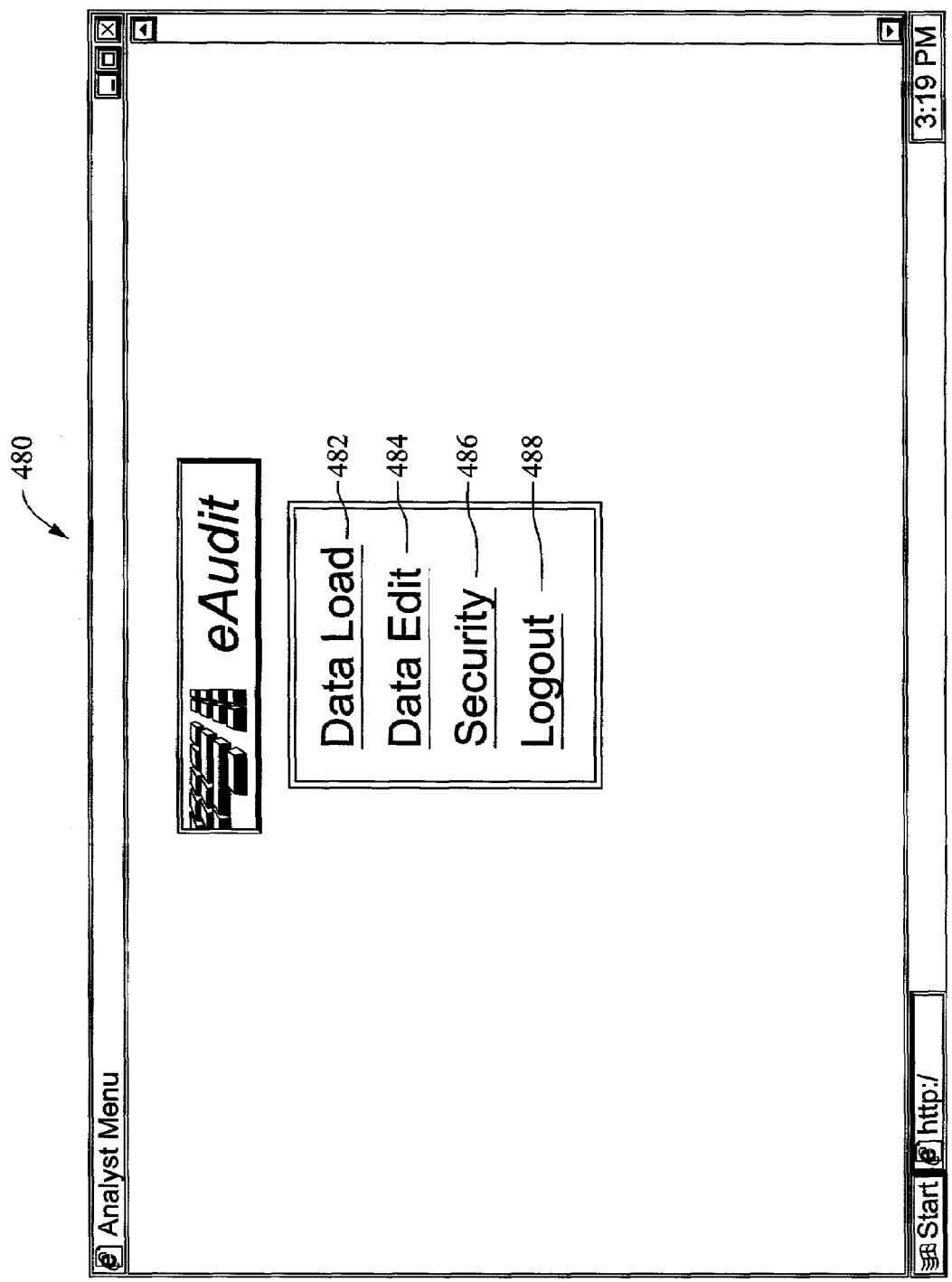
FIG. 11 is an example embodiment of a user interface of a TACS displaying a menu for a user that logs on as an analyst.

FIG. 11 is an example embodiment of a user interface 480 that illustrates a screen that is displayed when a user logs onto TACS 10 (shown in FIG. 1) as an analyst. In the example embodiment, an analyst includes an employee of the business entity, or someone that represents the business entity in tax related or other financial matters. User interface 480 includes at least one of the following hyperlinks: Data Load 482, Data Edit 484, Security 486, and Logout 488. Data Load 482 allows the analyst to add or append audit sample data and corresponding images to TACS 10. Data Edit 484 allows the analyst to view and edit specific fields for individual audit samples and generate selected control total reports. Security 486 allows the analyst to grant access permission to an auditor and business users by individual audit sample. Logout 488 allows the analyst to exit TACS 10.

FIG. 12 is an example embodiment of a user interface 490 that illustrates a screen that is displayed when a user logs onto TACS 10 (shown in FIG. 1) as an analyst. In the example embodiment, user interface 490 enables an analyst to add or append TA information 92 (shown in FIG. 3) for an audit sample in TACS 10. In the example embodiment, user interface 490 requests that the user select either a blank or an existing audit sample loaded into TACS 10.

Figure 13:
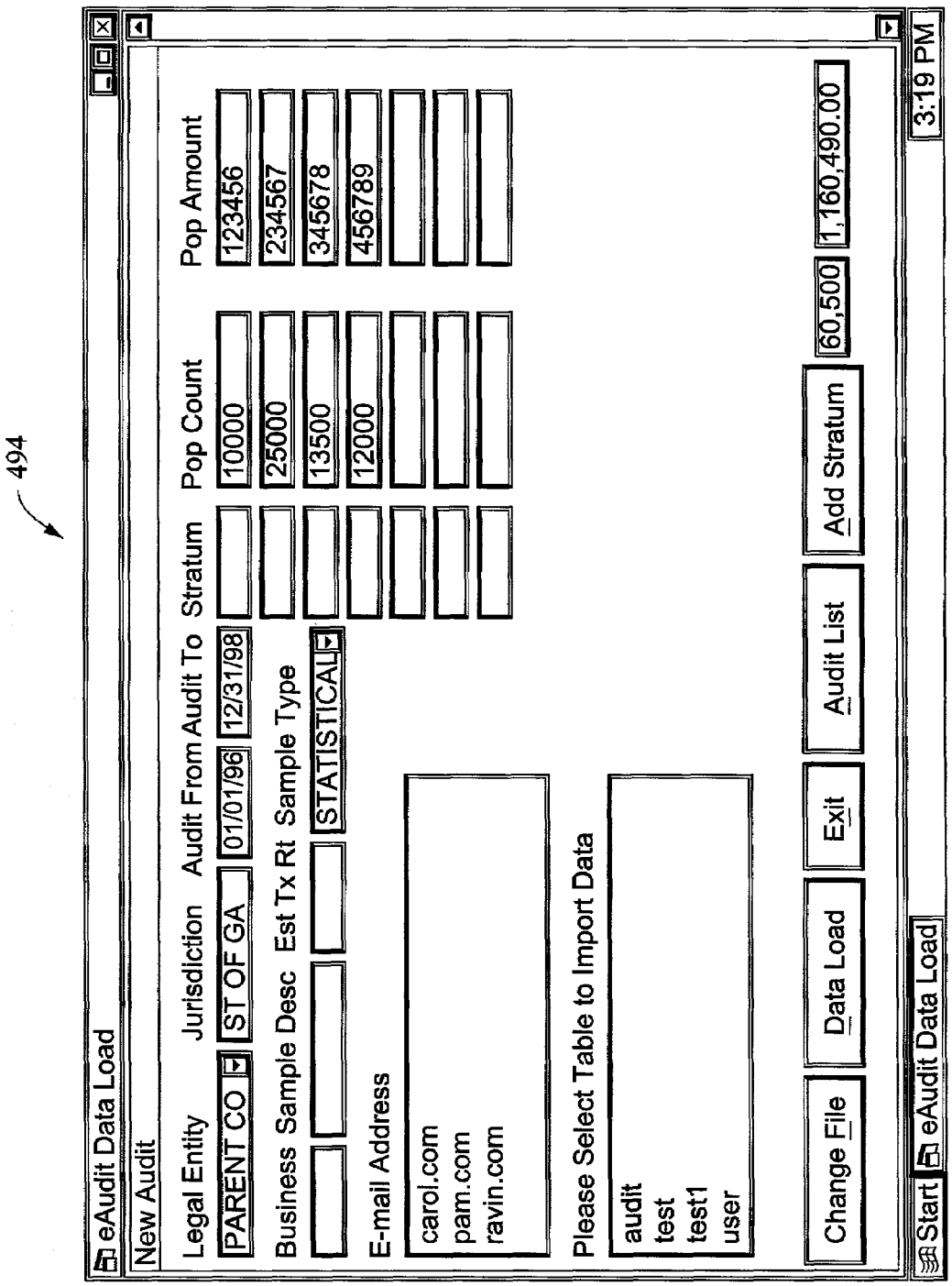
FIG. 13 is an example embodiment of a user interface of a TACS displaying another screen that relates to loading data into TACS by an analyst.

FIG. 13 is an example embodiment of a user interface 492 that illustrates a screen that is displayed when a user logs onto TACS 10 (shown in FIG. 1) as an analyst and selects a new audit sample option from user interface 490 (shown in FIG. 12). In the example embodiment, user interface 492 enables the analyst to add TA information 92 (shown in FIG. 3) for a new audit sample in TACS 10.

Figure 14:
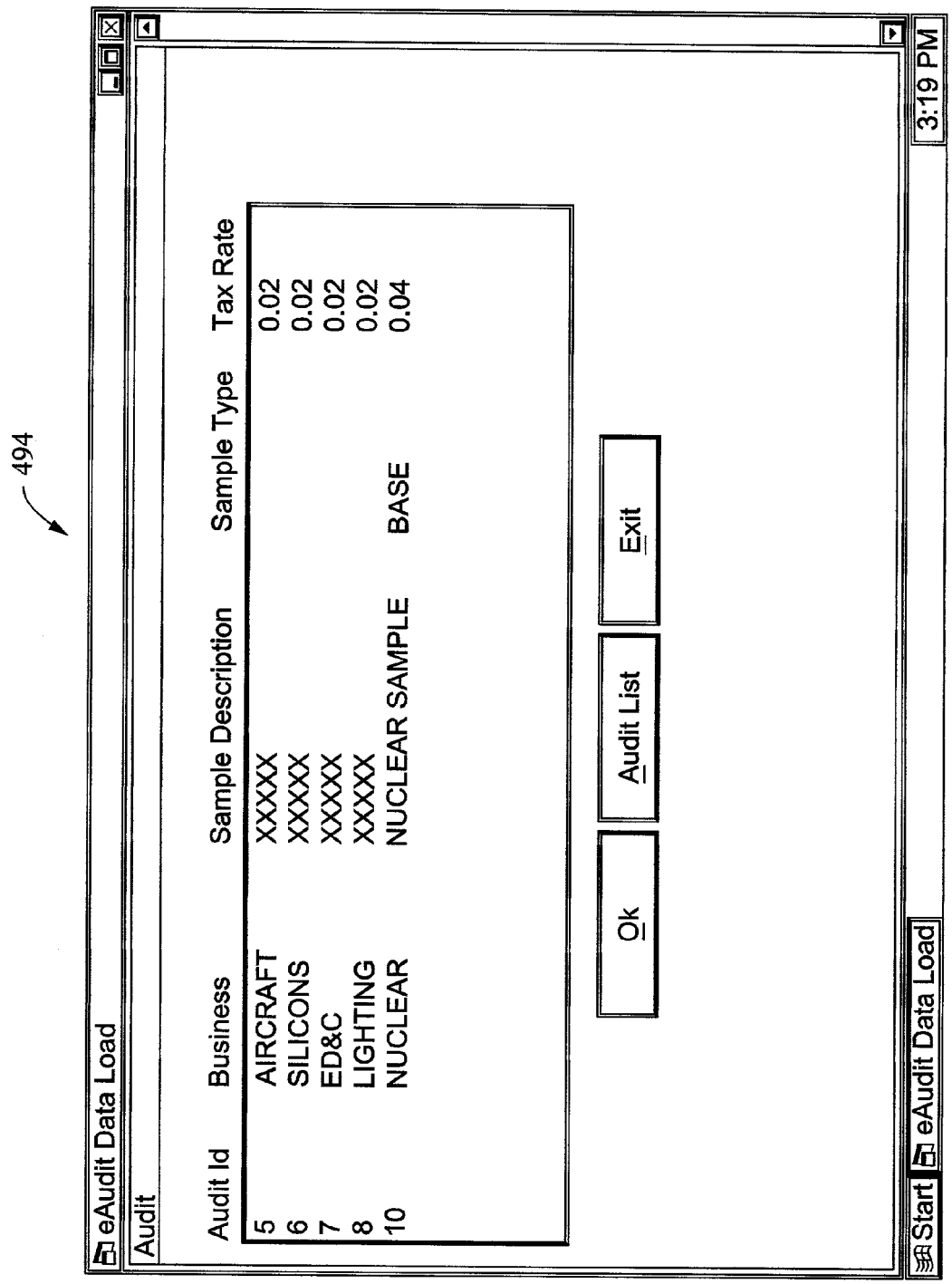
FIG. 14 is an example embodiment of a user interface of a TACS displaying another screen that relates to loading data into TACS by an analyst.

FIG. 14 is an example embodiment of a user interface 494 that illustrates a screen that is displayed when a user logs onto TACS 10 (shown in FIG. 1) as an analyst and selects an append audit sample option from user interface 490 (shown in FIG. 12). In the example embodiment, user interface 494 enables the analyst to append TA information 92 (shown in FIG. 3) for an existing audit sample already in TACS 10.

Figure 15:
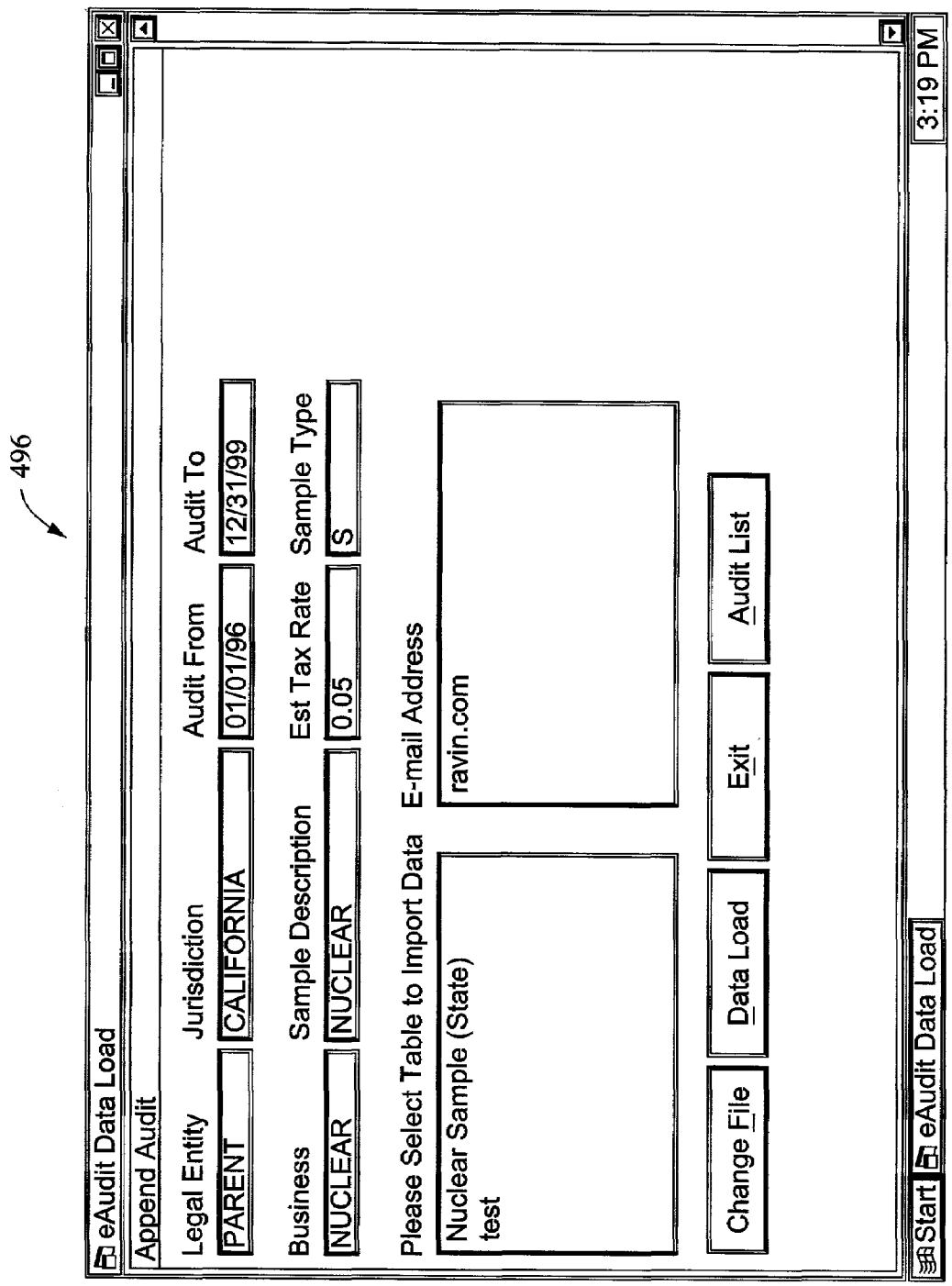
FIG. 15 is an example embodiment of a user interface of a TACS displaying another screen that relates to loading data into TACS by an analyst.

FIG. 15 is an example embodiment of a user interface 496 that illustrates a screen that is displayed when a user logs onto TACS 10 (shown in FIG. 1) as an analyst and selects an append audit sample option from user interface 490 (shown in FIG. 12). In the example embodiment, user interface 496 displays TA information 92 (shown in FIG. 3) for the appended audit sample. User interface 496 then permits the analyst to import data from a table.

Figure 16:
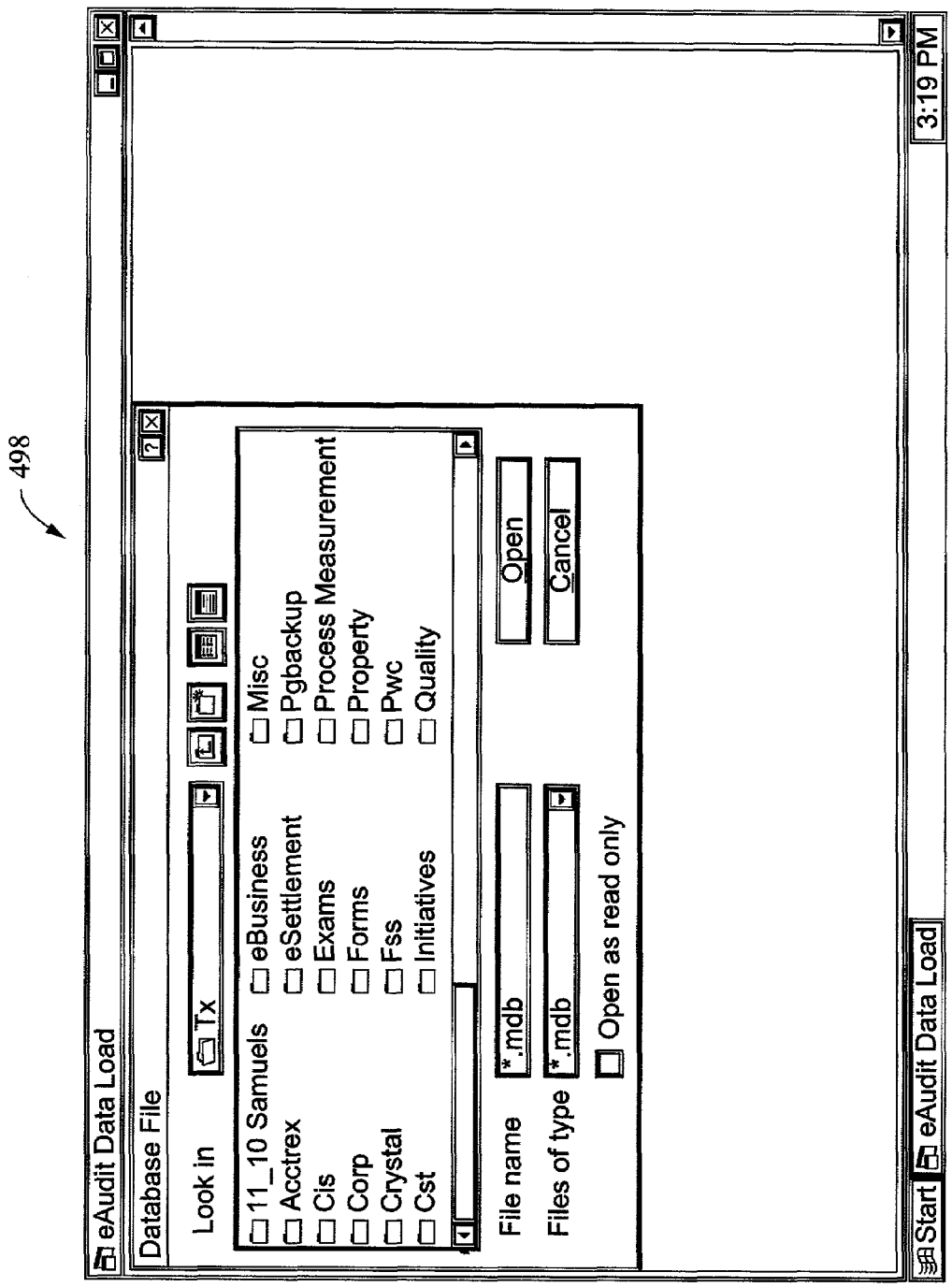
FIG. 16 is an example embodiment of a user interface of a TACS displaying another screen that relates to loading data into TACS by an analyst.

FIG. 16 is an example embodiment of a user interface 498 that illustrates a screen that is displayed when a user logs onto TACS 10 (shown in FIG. 1) as an analyst and selects an append audit sample option from user interface 490 (shown in FIG. 12). In the example embodiment, user interface 498 displays a screen that the analyst can navigate to locate and select the new data to be imported into TACS 10 for the audit sample being appended.

FIGS. 17A and 17B show an example embodiment of a table 500 illustrating data that maybe loaded into TACS 10 (shown in FIG. 1) during Data Load 482 (shown in FIG. 11). In the example embodiment, when Data Load 482 is selected, data is imported from an Access™ (Access is a trademark of Microsoft Corporation, Redmond, Wash.) database using the format shown in table 500. Table 500 has at least one of the following columns of data: Access Table Column 502, Data Type 504, Column Header 506, and Column Detail 508.

Figure 18:
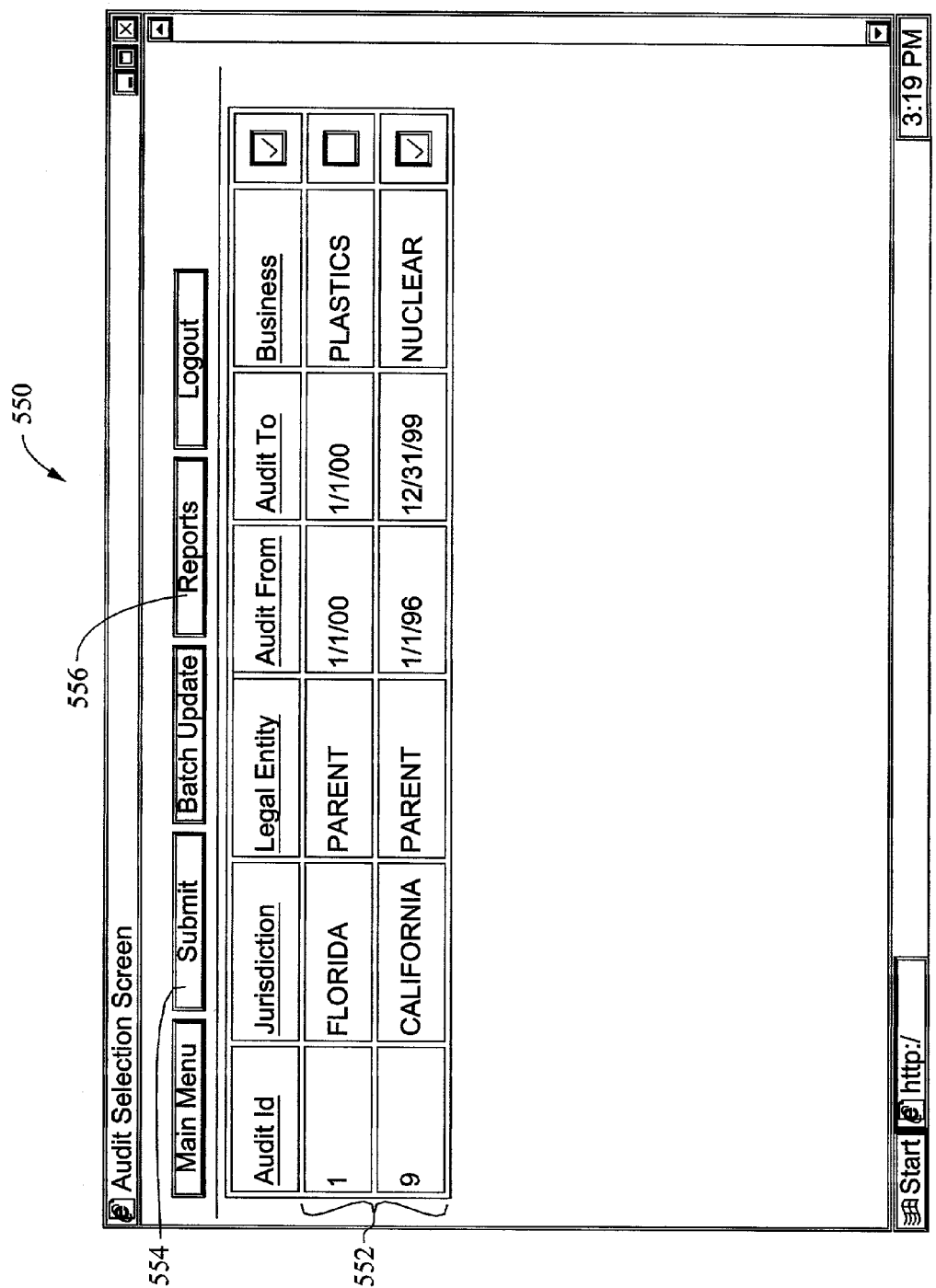
FIG. 18 is an example embodiment of a user interface of a TACS displaying a list of audit samples for review by an analyst.

FIG. 18 is an example embodiment of a user interface 550 that displays a list of audit samples 552 loaded into TACS 10 (shown in FIG. 1) after an analyst selects Data Edit 484 from user interface 480 (shown in FIG. 11). From user interface 550, an analyst can choose from audit samples 552 for which that particular analyst has been given access. Upon selecting a desired audit sample 552, the analyst can then select a Submit button 554, to view TA information 92 (shown in FIG. 3) for selected audit sample 552. User interface 550 also includes a Reports button 556.

FIG. 19 is an example embodiment of a user interface 580 that displays a data page that is provided to an analyst after audit sample 552 (shown in FIG. 18) and Submit button 554 (shown in FIG. 18) have been selected. User interface 580 displays TA information 92 (shown in FIG. 3) in a table including at least one of the following field headers: Reference Number 581, Merchandise Amount 582, Vendor Name 584, Tax Base 586, Voucher 588, Tax Rate 590, Business Entity Status 592, Jurisdiction Status 594, Voucher Description 596, Projected Tax 598, Comments 600, Jurisdiction Comments 602, Image 604, and Account Number 606. In the example embodiment, the data can be sorted by any of the various fields. In the example embodiment, the analyst can edit fields: Tax Base 586, Tax Rate 590, Comments 600, and Business Entity Status 592. In the example embodiment, Business Entity Status field 592 includes a drop down box that includes at least four options (not shown in FIG. 19) including No Issue (shown in FIG. 19), Overpayment, Research, and Underpayment.

User interface 580 also displays a Refresh button 608, a Change Audit button 610, a Filter button 612, a Save button 614, and an Extract button 616. In the example embodiment, Reference Number 581 allows a user to display and view a more detailed user interface showing TA information 92 for the selected Reference Number. In addition, Image 604 is a link that when selected displays a corresponding invoice for the selected Reference Number. Change Audit button 610 returns the user to user interface 550, and Filter button 612 displays a Filter screen (shown in FIG. 21) to the user. Extract button 616 exports selected data to a spreadsheet program, which in the example embodiment includes Excel™ (Excel is a trademark of Microsoft Corporation, Redmond, Wash.). User interface 580 also includes an Email Message button 618 which permits electronic messages to be sent.

FIG. 20 is an example embodiment of a user interface 640 that displays a data page that may be provided after Reference Number 581 link is selected from user interface 580 (shown in FIG. 19). User interface 640 displays TA information 92 (shown in FIG. 3) for a particular transaction in a table with at least one of the following field headers: Reference Number 581, Merchandise Amount 582, Vendor Name 584, Tax Base 586, Voucher 588, Tax Rate 590, Business Entity Status 592, Jurisdiction/Auditor Status 594, Voucher Description 596, Account Description 598, Comments 600, Jurisdiction Comments 602, and Account Number 606. In the example embodiment, user interface 640 also includes at least one button labeled View Image 642, which allows the user to view the corresponding invoice image. View Image button 642 has the same functionality as field header Image 604 shown in FIG. 19. In the example embodiment, the analyst can edit fields: Tax Base 586, Tax Rate 590, Comments 600, and Business Entity Status 592.

Figure 21:
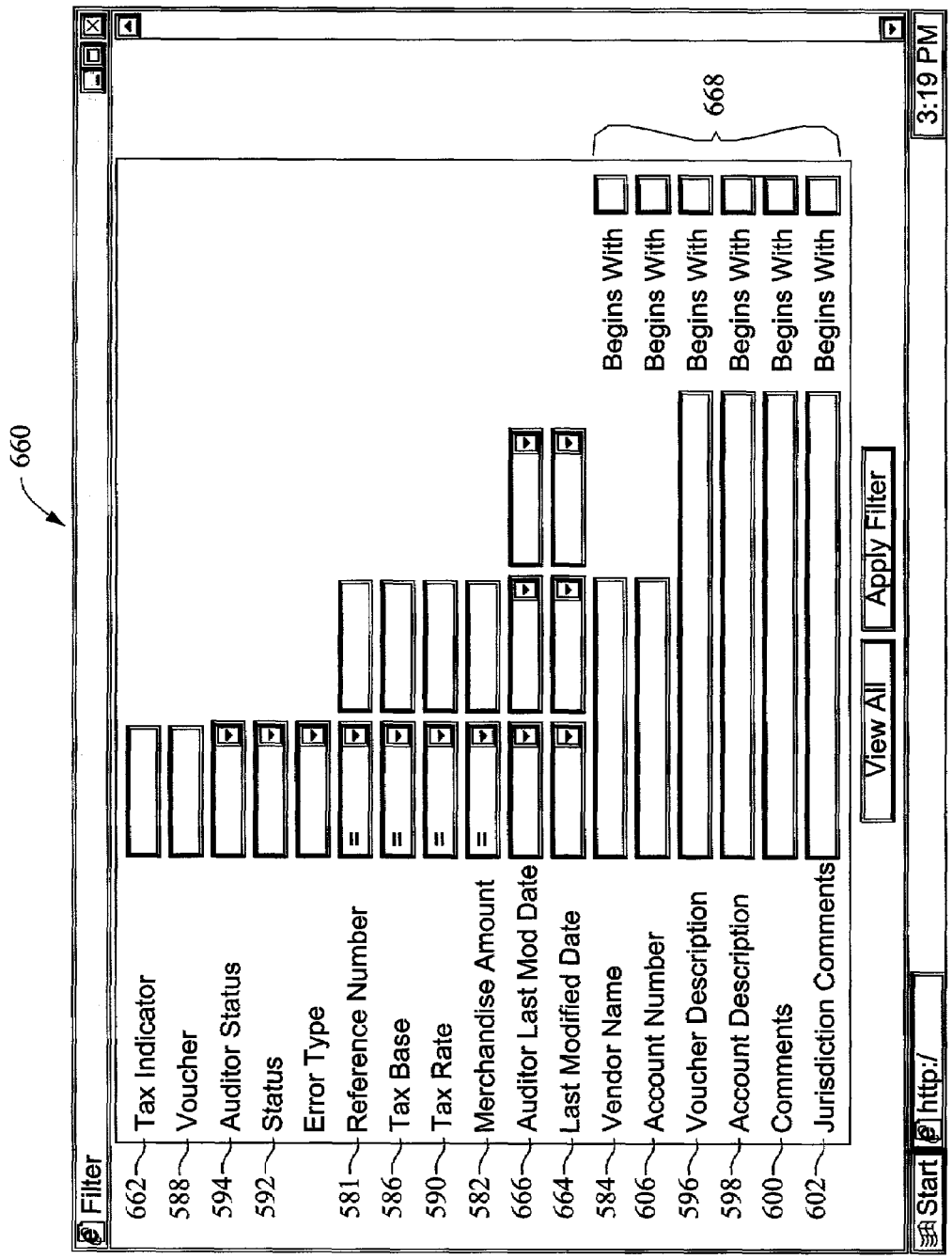
FIG. 21 is an example embodiment of a user interface of a TACS displaying a filter page that allows an analyst to view a selected subset of a selected audit sample.

FIG. 21 is an example embodiment of a user interface 660 that displays a screen that allows a selected subset of audit samples to be viewed. User interface 660 is accessed when the analyst selects Filter button 612 from user interface 580 (shown in FIG. 19). User interface 660 also includes at least one of the following field headers: Reference Number 581, Merchandise Amount 582, Vendor Name 584, Tax Base 586, Voucher 588, Tax Rate 590, Business Entity Status 592, Jurisdiction/Auditor Status 594, Voucher Description 596, Account Description 598, Comments 600, Jurisdiction Comments 602, and Account Number 606. In the example embodiment, user interface 660 also includes field headers labeled Tax Indicator 662, Last Modified 664, and Auditor Last Modified Date 666. In the example embodiment, the analyst can fill any field displayed with data to be used as a filter. Reference Number 581 and amount fields have drop down boxes (not shown in FIG. 21) for selecting "equal," "less than or equal to," or "greater than or equal to" options. Vendor Name 584, Account Number 606, Voucher Description 596, Comments 600, Jurisdiction Comments 602 fields have a "Begin With" option 668 which filters only on the string of data given and not the entire field.

FIG. 22 is an example embodiment of a user interface 680 that may be displayed after Extract button 616 on user interface 580 (shown in FIG. 19) is selected. User interface 680 allows an analyst to select desired columns to extract to a spreadsheet program by selecting a check box for each column desired in a Header Columns section 682 or a Detail Columns section 684. In the example embodiment, the spreadsheet program is in an Excel™ format (Excel is a trademark of Microsoft Corporation, Redmond, Wash.). In the example embodiment, user interface 680 also displays a file box 686 for entering a file name for exporting the data to a file in the spreadsheet program.

In the example embodiment, when either Image 604 hyperlink (shown in FIG. 19) or View Image button 642 (shown in FIG. 20) is selected, data is loaded so that all available images of invoices that correspond to the transaction are linked. Once the invoice is displayed, a user can zoom in or out on the image, can size the image to fit on the screen, and can invert the image on the screen.

FIG. 23 is an example embodiment of a user interface 720 that displays a report criteria 722 after a user selects Reports button 556 from user interface 550 (shown in FIG. 18). From user interface 720, a user can select header and detail fields within a selected audit sample to generate summary totals for those groupings.

Figure 24:
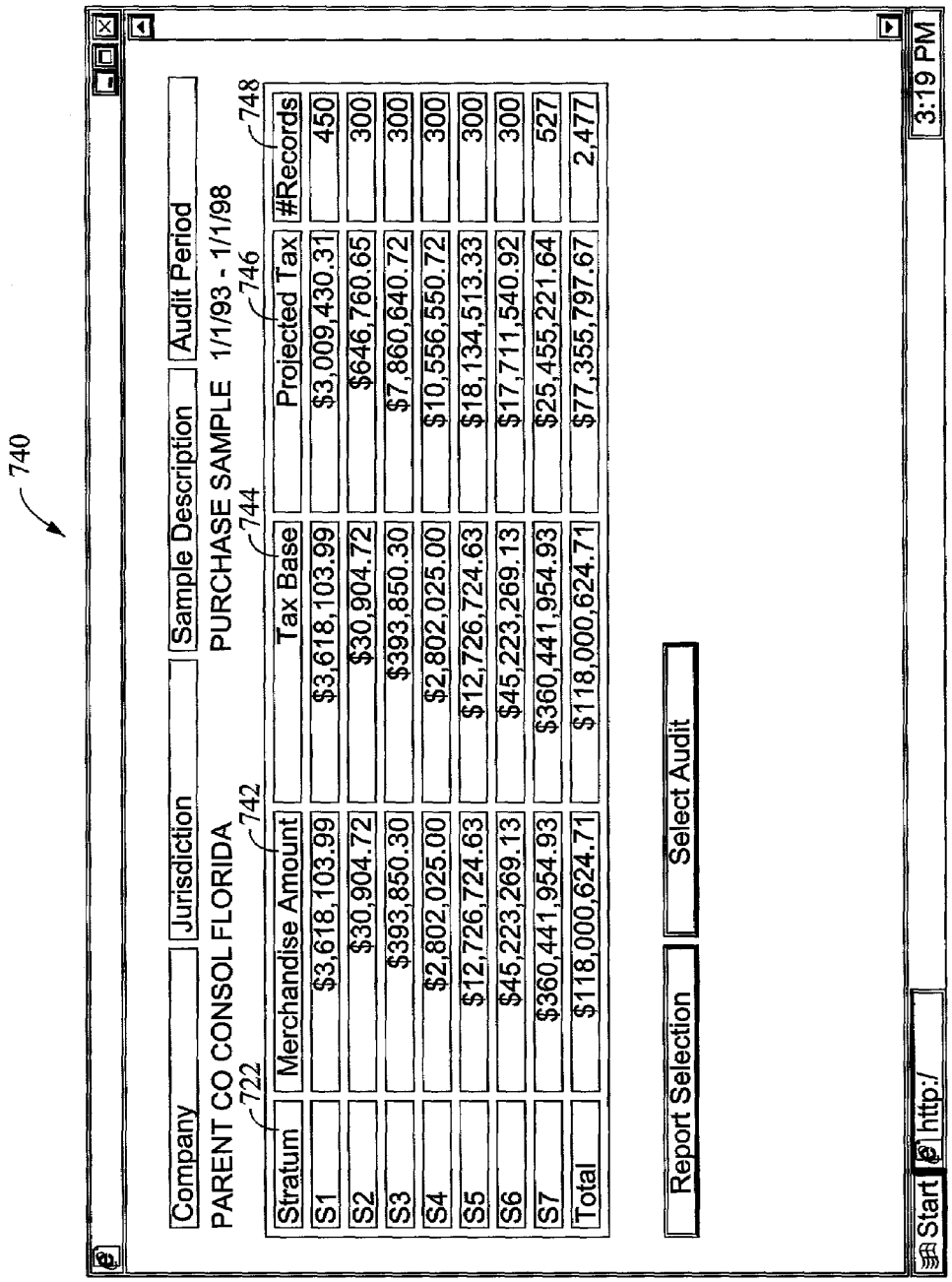
FIG. 24 is an example embodiment of a user interface of a TACS displaying a report screen for an analyst.

FIG. 24 is an example embodiment of an analyst Report Screen 740 that is displayed after report criteria 722 (shown in FIG. 23) is inputted into TACS 10 (shown in FIG. 1). In the example embodiment, Report Screen 740 displays summary totals for Merchandise Amount 742, Tax Base 744, Projected Tax 746, and Number of Records 748 grouped by the column report criteria 722 selected.

Figure 25:
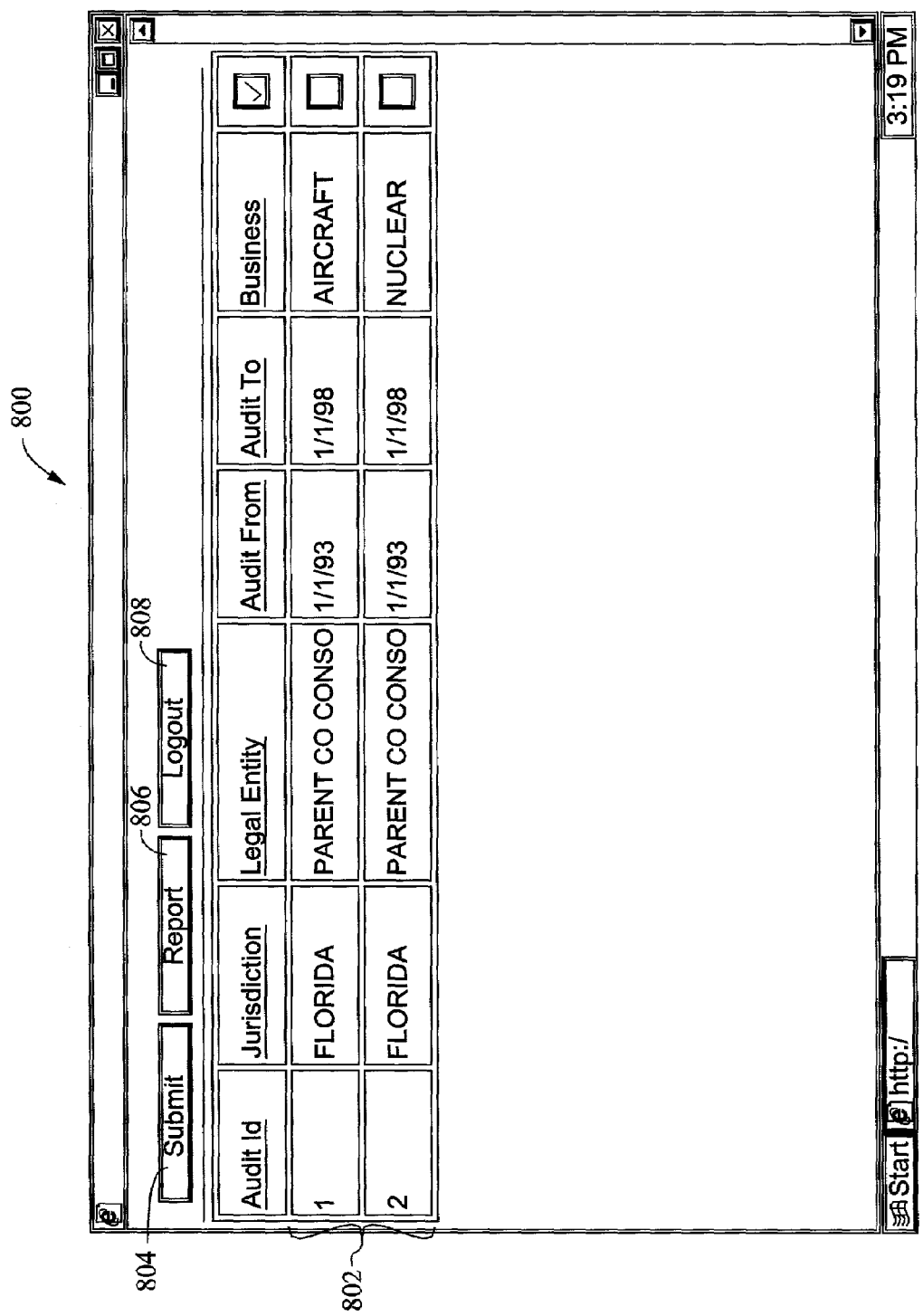
FIG. 25 is an example embodiment of a user interface of a TACS displaying a list of audit samples for review by a business user.

FIG. 25 is an example embodiment of a user interface 800 that displays a list of audit samples 802 which a user has been given access to for review. In the example embodiment, audit sample 802 is a parent company within the business entity that a business user has been assigned access rights. In an alternative embodiment, audit sample 802 is a subsidiary, department, affiliate, or facility within a business entity. User interface 800 also displays a "Submit" button 804, a "Report" button 806, and a "Logout" button 808. In the example embodiment, the business user selects audit sample 802 to be reviewed by highlighting it on the list and selecting Submit button 804. The business user can also select Report button 806 which will take the business to a Report screen.

FIG. 26 is an example embodiment of a user interface 820 that displays a data page that is provided after audit sample 802 and Submit button 804 (shown in FIG. 25) have been selected by the business user. User interface 820 displays TA information 92 (shown in FIG. 3) in a table with at least one of the following field headers: Reference Number 821, Merchandise Amount 822, Vendor Name 824, Voucher 828, Voucher Description 836, Account Description 838, Comments 840, Jurisdiction Comments 842, Image 844, and Account Number 846. In the example embodiment, the data can be sorted by the various fields. In the example embodiment, the business user can edit Comments 840 field.

User interface 820 also displays Total Merchandise Amount 848, Total Projected Tax 850, Filter Merchandise Amount 852, and Filter Projected Tax 854. User interface 820 also displays a Projected Tax 856 field for each transaction. User interface also displays a Refresh button 858, a Change Audit button 860, a Filter button 862, a Save button 864, and an Extract button 866. In the example embodiment, Reference Number 821 is a hyperlink that allows a user to display and view a more detailed user interface showing TA information 92 for the selected Reference number. In addition, Image 844 is a hyperlink that when selected displays a corresponding invoice for the selected Reference Number.

Figure 28:
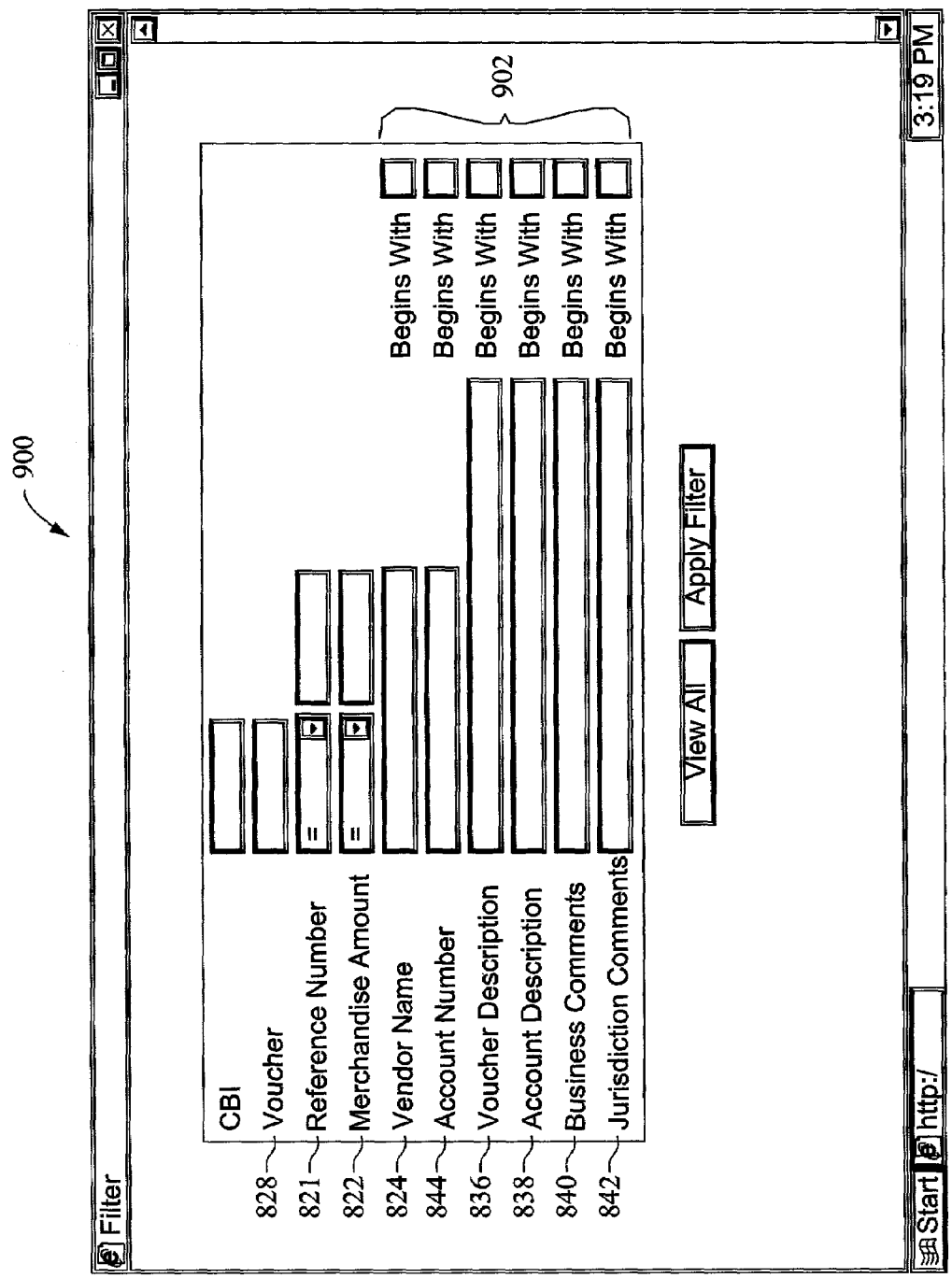
FIG. 28 is an example embodiment of a user interface of a TACS displaying a filter page that allows a business user to view a selected subset of a selected audit sample.

Change Audit button 860 returns the user to user interface 800, and Filter button 862 displays a Filter screen (shown in FIG. 28). Extract button 866 exports data to a spreadsheet program to be viewed by the business user. In the example embodiment, the spreadsheet program is in an Excel™ format.

Figure 27:
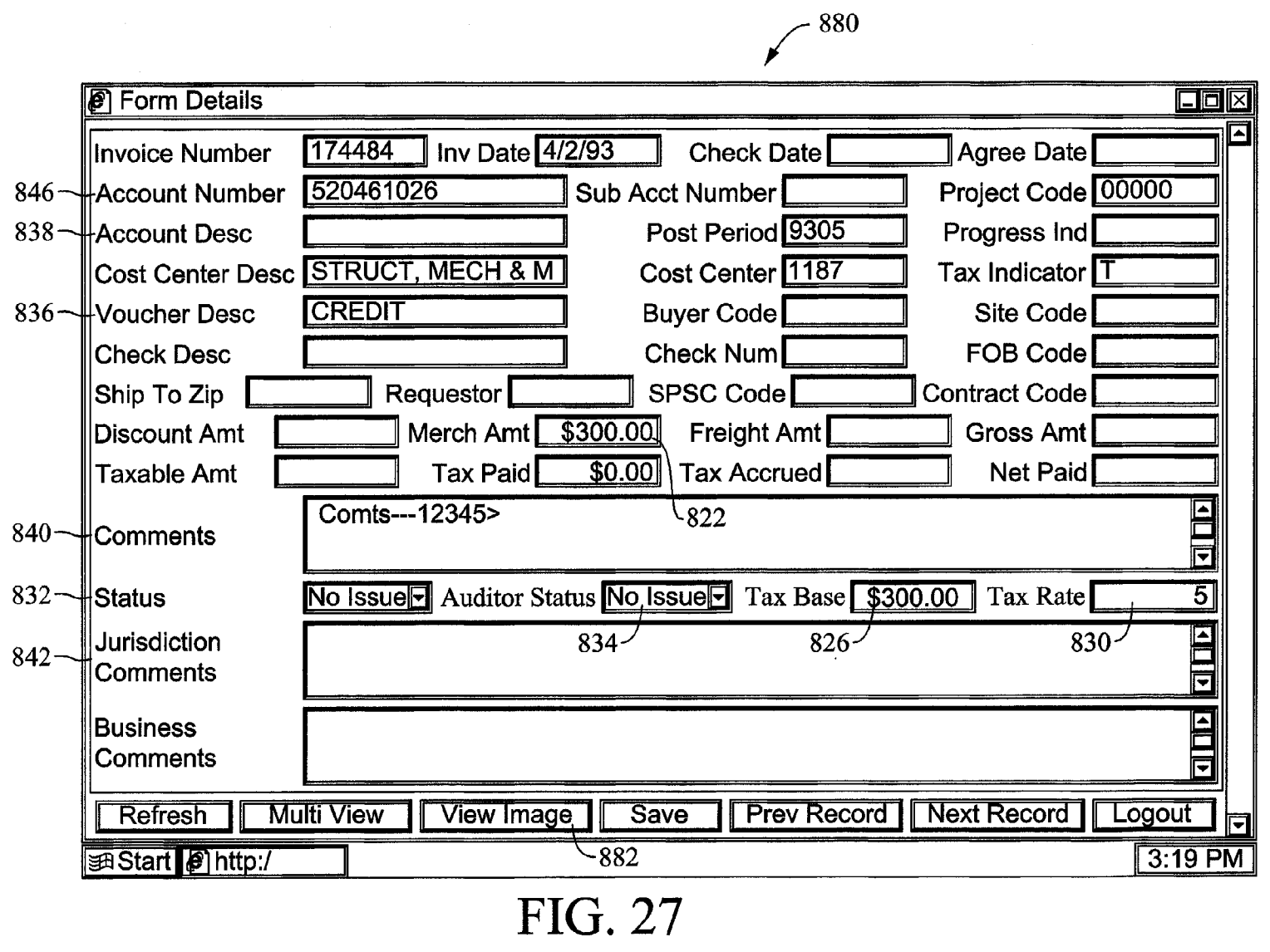

FIG. 27 is an example embodiment of a user interface 880 that displays a data page that may be provided after Reference Number 821 is selected from user interface 820 (shown in FIG. 26). User interface 880 displays TA information 92 (shown in FIG. 3) for a selected transaction in a table with at least one of the following field headers: Merchandise Amount 822, Tax Base 826, Tax Rate 830, Business Entity Status 832, Jurisdiction/Auditor Status 834, Voucher Description 836, Account Description 838, Comments 840, Jurisdiction Comments 842, and Account Number 846. In the example embodiment, user interface 880 also includes a button labeled View Image 882, which allows the user to view the corresponding invoice image. View Image button 882 has the same functionality as field header labeled Image 844 shown in FIG. 26. In the example embodiment, the business user can edit field: Comments 840.

FIG. 28 is an example embodiment of a user interface 900 that displays a screen that allows a selected subset of the audit samples to be viewed. User interface 900 is accessed when the business user selects Filter button 862 from user interface 820 (shown in FIG. 26). User interface 900 also includes at least one of the following field headers: Reference Number 821, Merchandise Amount 822, Vendor Name 824, Voucher 328, Voucher Description 836, Account Description 838, Comments 840, Jurisdiction Comments 842, and Account Number 844. In the example embodiment, the business user can fill any field displayed with data to be used as a filter. Reference Number 821 and amount fields have drop down boxes (not shown in FIG. 28) for selecting "equal," "less than or equal to," or "greater than or equal to" options. Vendor Name 824, Account Number 844, Voucher Description 836, Comments 840, Jurisdiction Comments 842 fields have a "Begin With" option 902 which filters only on the string of data given and not the entire field.

In the example embodiment, when either Image 844 hyperlink (shown in FIG. 26) or View Image button 882 (shown in FIG. 27) is selected, data is loaded into TACS 10 (shown in FIG. 1) so that all available images of invoices that correspond to the transaction are linked. Once the invoice is displayed, a user can zoom in or out on the image, can size the image to fit on the screen, and can invert the image on the screen.

Figure 29:
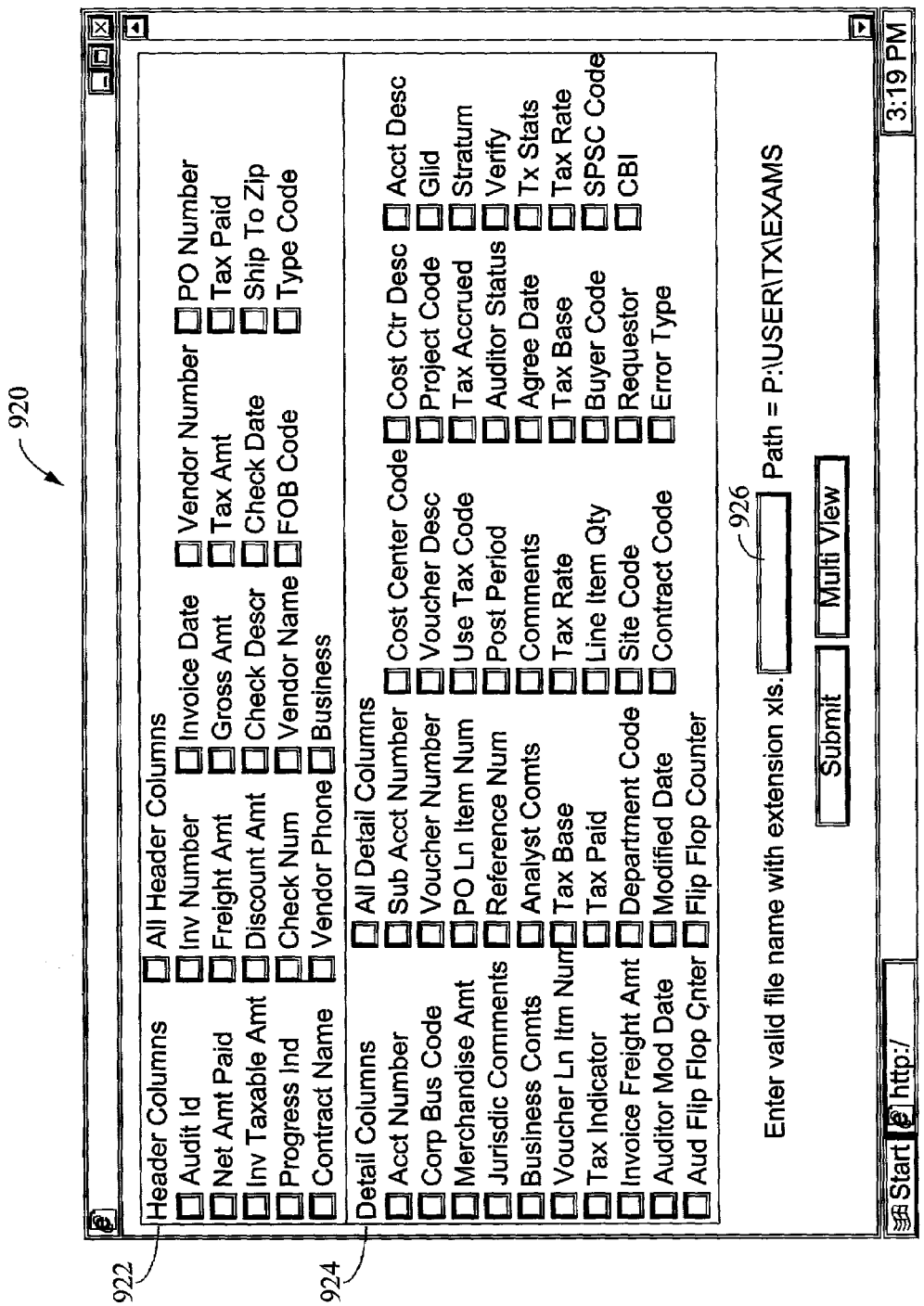
FIG. 29 is an example embodiment of a user interface of a TACS displaying a screen that a business user can select from to extract data to a spreadsheet program.

FIG. 29 is an example embodiment of a user interface 920 that may be displayed after Extract button 866 on user interface 820 (shown in FIG. 26) is selected. User interface 920 allows a business user to select desired columns to extract to a spreadsheet program by selecting a check box for each column desired in a Header Columns section 922 or a Detail Columns section 924. In the example embodiment, the spreadsheet program is in an Excel™ format. In the example embodiment, user interface 920 also displays a file box 926 for entering a file name for exporting the data to a file in the spreadsheet program.

FIG. 30 is an example embodiment of a user interface 940 that displays a report criteria 942 after a user selects Reports button 806 from user interface 800 (shown in FIG. 25). From user interface 940, a user can select header and detail fields within a selected audit sample to generate summary totals for those groupings.

FIG. 31 is an example embodiment of a business Report Screen 960 that is displayed after report criteria 942 (shown in FIG. 30) is inputted into TACS 10 (shown in FIG. 1). In the example embodiment, Report Screen 960 displays summary totals for Merchandise Amount 962, Tax Base 964, Projected Tax 966, and Number of Records 968 grouped by the column report criteria 942 selected.

FIGS. 32-41 are at least some of the data tables and key fields used within TACS 10 (shown in FIG. 1).

TACS 10 therefore enables a business entity to manage TA information, provide TA information to multiple auditors within multiple taxing jurisdictions, review comments and findings from auditors on multiple business transactions conducted throughout the world, respond to the auditors' comments and findings, confirm that a proper amount of tax has been remitted to the proper taxing jurisdictions, and confirm that the business entity is in compliance with applicable tax laws and regulations and/or internal business standards and policies. Additionally, TACS 10 enables a business entity to provide documents relating to TA information to an auditor in a timely manner. By enabling a business entity to better manage TA information, TACS 10 facilitates reducing transaction costs for the business entity and facilitates reducing the amount of time spent on each audit by the business entity.

While the invention has been described in terms of various specific embodiments, those skilled in the art will recognize that the invention can be practiced with modification within the spirit and scope of the claims.

What is claimed is:

1. A method for managing tax audit (TA) information for a business entity using a server system coupled to a centralized database and a plurality of computer systems, said method comprising:

associating at least one computer with at least one auditor, the auditor is associated with a taxing jurisdiction and facilitates determining whether a correct amount of use tax has been paid by the business entity to the associated taxing jurisdiction;

associating at least one computer with the business entity;

receiving at the server system TA information from a user using the business entity computer, the TA information including data relating to a plurality of business transactions entered into by the business entity wherein each transaction is potentially subject to a use tax;

storing TA information received at the server system in the centralized database;

tracking TA information stored in the centralized database;

updating the centralized database periodically with newly received TA information to maintain TA information;

providing the auditor with access to specific TA information stored in the database by a user associated with the business entity;

prompting the auditor to submit an inquiry to the server system from the auditor computer for TA information relating to a selected business transaction that the auditor has been granted access to;

displaying TA information for the selected business transaction including at least one document representing the business transaction on the auditor computer; and determining by the auditor based on a review of the displayed TA information whether the business entity has paid a correct amount of use tax to the taxing jurisdiction associated with the auditor for the selected business transaction.

2. A method in accordance with claim 1 further comprising notifying a predesignated party of a review of TA information by the auditor including providing the predesignated party with at least one of comments and findings of the auditor relating to the review.

3. A method in accordance with claim 1 wherein receiving TA information comprises receiving at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction for each facility within a business entity.

4. A method in accordance with claim 1 wherein receiving TA information comprises receiving TA information input through the business entity computer.

5. A method in accordance with claim 1 wherein tracking TA information comprises compiling a data report including at least one of a reference number, a merchandise amount, a vendor name, a tax base, a voucher number, a tax rate, a business entity status, a jurisdiction/auditor status, a voucher description, an account description, comments, jurisdiction comments, image, and account number.

6. A method in accordance with claim 1 wherein tracking TA information comprises compiling a data report that includes a selected subset of at least one of a reference number, merchandise amount, vendor name, tax base, voucher, tax rate, business entity status, jurisdiction/auditor status, voucher description, account description, comments, jurisdiction comments, a document image, and an account number.

7. A method in accordance with claim 1 wherein tracking TA information comprises exporting TA information selected by a user to a spreadsheet computer program for review.

8. A method in accordance with claim 1 wherein tracking TA information further comprises linking at least one of invoices, exemption certificates, and other documents relating to use taxes paid to a taxing jurisdiction to a business transaction within an audit sample.

9. A method in accordance with claim 1 wherein prompting the auditor to submit an inquiry comprises:

displaying designated audit samples on the auditor computer; and receiving an inquiry from the auditor computer regarding at least one of the audit samples.

10. A method in accordance with claim 1 wherein displaying TA information comprises:

displaying information on the auditor computer regarding at least one of a reference number, a merchandise amount, a vendor name, a tax base, a voucher number, a tax rate, a business entity status, a jurisdiction/auditor status, a voucher description, an account description, business entity comments, jurisdiction comments, a document image, and an account number; and receiving an inquiry from the auditor computer regarding at least one of the reference number, the merchandise amount, the vendor name, the tax base, the voucher number, the tax rate, the business entity status, the jurisdiction/auditor status, the voucher description, the account description, business entity comments, jurisdiction comments, the document image, and the account number.

11. A method in accordance with claim 1 wherein displaying TA information comprises:
   accessing the centralized database;
   searching the database regarding the specific inquiry;
   retrieving information from the database; and
   transmitting the retrieved information to the auditor computer for display by the auditor computer.

12. A method in accordance with claim 1 wherein displaying TA information comprises providing at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction for a business entity to at least one of an auditor, an analyst, and a business user.

13. A method in accordance with claim 2 wherein notifying the predesignated party comprises transmitting an electronic message to an analyst from the auditor notifying the analyst that a review of the TA information by the auditor has occurred, and notifying the analyst of the auditor's comments and findings relating to the review of the TA information.

14. A method in accordance with claim 1 further comprising connecting the plurality of computer systems and the server system via a network that includes one of a wide area network, a local area network, an intranet and the Internet.

15. A method for managing tax audit (TA) information for a business entity using a server system coupled to a centralized database, at least one managerial user system, and a plurality of computer systems, said method comprising:
   associating at least one computer with at least one auditor, the auditor is associated with a taxing jurisdiction and facilitates determining whether a correct amount of use tax has been paid by the business entity to the associated taxing jurisdiction;
   associating at least one computer with the business entity;
   receiving at the server system TA information from a user using the business entity computer, the TA information including data relating to a plurality of business transactions entered into by the business entity wherein each transaction is potentially subject to a use tax, the TA information further including at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction;
   storing TA information received at the server system in the centralized database;
   tracking TA information stored in the centralized database;
   updating the centralized database periodically with newly received TA information to maintain TA information;
   providing the auditor with access to specific TA information stored in the database by a user associated with the business entity;
   prompting the auditor to submit an inquiry to the server system from the auditor computer for TA information relating to a selected business transaction that the auditor has been granted access to;
   display displaying TA information for the selected business transaction including at least one document representing the business transaction on the auditor computer;
   auditing the selected business transaction based on the displayed TA information to determine by the auditor whether the business entity has paid a correct amount of use tax to the taxing jurisdiction associated with the auditor for the selected business transaction;
   notifying the user of the results of the audit of the selected business transaction; and
   providing an electronic report of the audit results to the managerial user system, which includes at least one of a summary of TA information reviewed, and comments and findings of the auditor relating to the review of the TA information.

16. A method in accordance with claim 15 wherein receiving TA information comprises receiving an audit sample from an analyst through the business entity computer, the audit sample includes TA information for a designated facility within the business entity.

17. A method in accordance with claim 15 wherein tracking TA information comprises:
   compiling a data report including at least one of the reference number, the merchandise amount, the vendor name, the tax base, the voucher number, the tax rate, the business entity status, the jurisdiction/auditor status, the voucher description, the account description, comments, jurisdiction comments, the document image, and the account number;
   compiling a data report that includes a selected subset of at least one of the reference number, the merchandise amount, the vendor name, the tax base, the voucher number, the tax rate, the business entity status, the jurisdiction/auditor status, the voucher description, the account description, comments, jurisdiction comments, the document image, and the account number;
   exporting TA information selected by a user to a spreadsheet computer program for review; and
   linking at least one of invoices, exemption certificates, and other documents relating to use taxes paid to a taxing jurisdiction to a business transaction within an audit sample.

18. A method in accordance with claim 15 wherein providing an electronic report comprises transmitting an electronic report to the managerial user system from an analyst including a summary of the review of TA information, and the auditor's comments and findings such that managerial oversight of the TA information is facilitated and compliance with tax laws, rules, regulations, standards, and policies is assured.

19. A method for managing tax audit (TA) information for a business entity using a web-based system including a server system coupled to a centralized database, a managerial user system and a plurality of computer systems, said method comprising:
   associating at least one computer with at least one auditor, the auditor is associated with a taxing jurisdiction and facilitates determining whether a correct amount of use tax has been paid by the business entity to the associated taxing jurisdiction;

associating at least one computer with the business entity;

receiving at the server system TA information from a user using the business entity computer, the TA information including data relating to a plurality of business transactions entered into by the business entity wherein each transaction is potentially subject to a use tax, the TA information further including at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction;

storing TA information received at the server system in the centralized database;

tracking TA information including compiling data reports, exporting TA information, and linking documents to a business transaction within an audit sample;

updating the centralized database with TA information including adding and deleting information to revise existing TA information;

providing the auditor with access to specific TA information stored in the database by a user associated with the business entity;

prompting the auditor to submit an inquiry to the server system from the auditor computer for TA information relating to a selected business transaction that the auditor has been granted access to;

display displaying TA information for the selected business transaction including at least one document representing the business transaction on the auditor computer;

auditing the selected business transaction based on the displayed TA information to determine by the auditor whether the business entity has paid a correct amount of use tax to the taxing jurisdiction associated with the auditor for the selected business transaction;

notifying the user through an electronic message of the results of the audit of the selected business transaction, including the auditor's comments and findings relating to the review of the TA information; and providing a report of the audit results by transmitting an electronic report to the managerial user system, which includes a summary of the review of TA information, and the auditor's comments and findings such that managerial oversight of the TA information is facilitated and compliance with tax laws, rules, regulations, standards, and policies is assured.

20. A network based system for managing tax audit (TA) information for a business entity, said system comprising:

a plurality of computer systems, wherein a first computer system is associated with at least one auditor, said auditor associated with a taxing jurisdiction for facilitating determining whether a correct amount of use tax has been paid by the business entity to the associated taxing jurisdiction, and a second computer system is associated with the business entity;

a centralized database for storing information;

a server system configured to be coupled to said plurality of computer systems client and said database, said server system further configured to:

receive TA information from a user using the business entity computer, the TA information including data relating to a plurality of business transactions entered into by the business entity wherein each transaction is potentially subject to a use tax;

store TA information in the centralized database;

track TA information;

update the centralized database periodically with newly received TA information to maintain TA information;

provide the auditor with access to specific TA information stored in the database by a user associated with the business entity;

prompt the auditor to submit an inquiry to the server system from the auditor computer for TA information relating to a selected business transaction that the auditor has been granted access to;

display on the auditor computer TA information for the selected business transaction including at least one document representing the business transaction;

enable the auditor to review the TA information for the selected business transaction to determine whether the business entity has paid a correct amount of use tax to the taxing jurisdiction associated with the auditor for the selected business transaction; and notify the user electronically of the review of the TA information by the auditor, including the auditor's comments and findings relating to the review of the TA information.

21. A system in accordance with claim 20 wherein each of the plurality of computer systems further comprises at least one of:

a displaying component for displaying at least one of a pull-down list, a check box, and hypertext link options relating to TA information;

a sending component to send an inquiry to the server system so that the server system can process and download the requested information to the computer systems;

a collection component for collecting TA information from users into the centralized database;

a tracking component for tracking TA information;

a displaying component for displaying TA information on at least one audit sample;

a receiving component for receiving an inquiry regarding at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction;

an accessing component for accessing the centralized database and causing the retrieved information to be displayed on the computer systems; and a notifying component for electronically notifying users that a review of TA information by the auditor has occurred, and of the auditor's comments and findings relating to the review of the TA information.

22. A system in accordance with claim 20 wherein said server system further comprises a receiving component for receiving an inquiry to provide information from one of a plurality of users.

23. A system in accordance with claim 20 wherein said server system further comprises a processing component for searching and processing received inquiries against the database containing information collected by the collection component, and for tracking the TA information.

24. A system in accordance with claim 20 wherein said server system further comprises a retrieving component to retrieve TA information from the database.

25. A system in accordance with claim 20 wherein said server system further comprises an information fulfillment component that downloads the requested information after retrieving from the database.

26. A system in accordance with claim 20 wherein said server system further comprises a receiving component that receives an inquiry from the computer systems regarding at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction.

27. A system in accordance with claim 20 wherein said server system further comprises at least one of a receiving component that receives information directly through the client system, and a receiving component that receives information in a pre-determined format established for inputting TA information.

28. A system in accordance with claim 20 wherein said server system further comprises a tracking component that accomplishes at least one of:
  compiling a data report including at least one of a reference number, a merchandise amount, a vendor name, a tax base, a voucher number, a tax rate, a business entity status, a jurisdiction/auditor status, a voucher description, an account description, comments, jurisdiction comments, a document image, and an account number;
  compiling a data report that includes a selected subset of at least one of the reference number, the merchandise amount, the vendor name, the tax base, the voucher number, the tax rate, the business entity status, the jurisdiction/auditor status, the voucher description, the account description, comments, jurisdiction comments, the document image, and the account number;
  exporting TA information selected by a user to a spreadsheet computer program for review; and
  linking at least one of invoices, exemption certificates, and other documents relating to use taxes paid to a taxing jurisdiction to a business transaction within an audit sample.

29. A system in accordance with claim 20 wherein said server system further comprises a notifying component that notifies the user via transmitting an electronic message to one of the computer systems of the review of the TA information by the auditor, including the auditor's comments and findings relating to the review of the TA information.

30. A network based system for managing, storing, and disseminating tax audit (TA) information for a business entity, said system comprising:
  a plurality of computer systems, wherein a first computer system is associated with at least one auditor, said auditor associated with a taxing jurisdiction for facilitating determining whether a correct amount of use tax has been paid by the business entity to the associated taxing jurisdiction, and a second computer system is associated with the business entity;
  a managerial user system comprising a browser;
  a centralized database for storing information;
  a server system configured to be coupled to said client system, said managerial user system, and said database, said server system further configured to:
  receive TA information from a user using the business entity computer, said TA information comprising data relating to a plurality of business transactions entered into by the business entity wherein each transaction is potentially subject to a use tax, the TA information further including at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction;
  store TA information in the centralized database;
  track TA information;
  update the centralized database periodically with newly received TA information to maintain TA information;
  provide the auditor with access to specific TA information stored in the database by a user associated with the business entity;
  prompt the auditor to submit an inquiry to the server system from the auditor computer for TA information relating to a selected business transaction that the auditor has been granted access to;
  display on the auditor computer TA information for the selected business transaction including at least one document representing the business transaction;
  audit the selected business transaction based on the displayed TA information to determine by the auditor whether the business entity has paid a correct amount of use tax to the taxing jurisdiction associated with the auditor for the selected business transaction;
  notify the user electronically via the business computer system of the results of the audit of the selected business transaction; and
  provide an electronic report of the audit results to the managerial user system, which includes a summary of the TA information reviewed, and the auditor's comments and findings relating to the review of the TA information.

31. A system in accordance with claim 30 wherein said server system further configured to:
  display designated audit samples on the the plurality of computer systems for at least one of an auditor, an analyst, and a business user; and
  receive an inquiry from the computer systems regarding at least one of the audit samples.

32. A system in accordance with claim 30 wherein said server system further comprises a receiving component that receives an inquiry from the auditor computer regarding certain topics including at least one of the reference number, the merchandise amount, the vendor name, the tax base, the voucher number, the tax rate, the business entity status, the jurisdiction/auditor status, the voucher description, the account description, business entity comments, jurisdiction comments, the document image, the account number, business information, amounts remitted to taxing jurisdiction, invoices, exemption certificates, and other documents relating to use taxes paid to a taxing jurisdiction.

33. A system in accordance with claim 30 wherein said server system further comprises a processing component that cross-references TA information to assure compliance with tax laws, rules, regulations, standards, and policies.

34. A system in accordance with claim 30 wherein said server system further comprises a notifying component that notifies users by transmitting an electronic report from the server system of a review of the TA information by an auditor, including the auditor's comments and findings relating to the review of the TA information.

35. A system in accordance with claim 30 wherein said server system further comprises a providing component that provides an electronic report to the managerial user system by transmitting an electronic report to the managerial user system from an analyst comprising a summary of the review of TA information, including the auditor's comments and findings, such that managerial oversight of the TA information is facilitated and compliance with tax laws, rules, regulations, standards, and policies is assured.

36. A computer program embodied on a computer readable medium for managing tax audit (TA) information for a business entity, said program comprising a code segment that receives TA information from a user associated with the business entity and then:
 receives information from at least one auditor, the auditor is associated with a taxing jurisdiction and facilitates determining whether a correct amount of use tax has been paid by the business entity to the associated taxing jurisdiction;
 maintains a database by adding, deleting and updating TA information, the TA information including data relating to a plurality of business transactions entered into by the business entity wherein each transaction is potentially subject to a use tax;
 provides users with access to TA information;
 generates data reports based on TA information that include at least one of a reference number, a merchandise amount, a vendor name, a tax base, a voucher number, a tax rate, a business entity status, a jurisdiction/auditor status, a voucher description, an account description, business entity comments, jurisdiction comments, a document image, an account number, business information, amounts remitted to taxing jurisdiction, invoices, exemption certificates, and other documents relating to use taxes paid to a taxing jurisdiction;
 compiles data reports that include at least one of the reference number, the merchandise amount, the vendor name, the tax base, the voucher number, the tax rate, the business entity status, the jurisdiction/auditor status, the voucher description, the account description, comments, jurisdiction comments, the document image, and the account number;
 compiles data reports that include a selected subset of at least one of the reference number, the merchandise amount, the vendor name, the tax base, the voucher number, the tax rate, the business entity status, the jurisdiction/auditor status, the voucher description, the account description, comments, jurisdiction comments, the document image, and the account number;
 exports TA information selected by the user to a spreadsheet computer program for review;
 links at least one of invoices, exemption certificates, and other documents relating to use taxes paid by the business entity to a taxing jurisdiction for each business transaction within an audit sample;
 provides the at least one auditor with access to specific TA information stored in the database by a user associated with the business entity;
 prompts the auditor to submit an incluiry from an auditor computer for TA information relating to a selected business transaction that the auditor has been granted access to;
 displays on the auditor computer TA information for the selected business transaction including at least one document representing the business transaction;
 enables the auditor to review the TA information for the selected business transaction to determine whether the business entity has paid a correct amount of use tax to a taxing jurisdiction associated with the auditor for the selected business transaction;
 notifies the user of the review of TA information for the selected business transaction by the auditor; and
 provides a report comprising a summary of the review of the TA information, including the auditor's comments and findings.

37. A computer program in accordance with claim 36 further comprising a code segment that provides at least one of an option to filter TA information based on at least one of the reference number, the merchandise amount, the vendor name, the tax base, the voucher number, the tax rate, the business entity status, the jurisdiction/auditor status, the voucher description, the account description, comments, jurisdiction comments, the document image, and the account number.

38. A computer program in accordance with claim 36 further comprising a code segment that generates a display of at least one of the reference number, the merchandise amount, the vendor name, the tax base, the voucher number, the tax rate, the business entity status, the jurisdiction/auditor status, the voucher description, the account description, business entity comments, jurisdiction comments, the document image, the account number, business information, amounts remitted to taxing jurisdiction, invoices, exemption certificates, and other documents relating to use taxes paid to a taxing jurisdiction for each facility within a business entity.

39. A computer program in accordance with claim 36 further comprising:
 a code segment that accesses said database;
 a code segment that searches said database in response to an inquiry;
 a code segment that retrieves information from said database;
 a code segment that causes retrieved information to be displayed on a client system;
 a code segment that notifies a user of a review of the TA information; and
 a code segment that causes a report summarizing the review of TA information to be transmitted.

40. A computer program in accordance with claim 36 further comprising a code segment that monitors the security of the system by restricting access to authorized individuals.

41. A computer program in accordance with claim 36 further comprising a code segment that cross-references existing TA information with newly received TA information.

* * * * *

UNITED STATES PATENT AND TRADEMARK OFFICE
CERTIFICATE OF CORRECTION

PATENT NO. : 7,295,998 B2  Page 1 of 1
APPLICATION NO. : 10/062011
DATED : November 13, 2007
INVENTOR(S) : Kulkarni et al.

It is certified that error appears in the above-identified patent and that said Letters Patent is hereby corrected as shown below:

Column 9, line 16, delete "NoLogout" and insert therefor --"No-Logout"--.

Claim 15, column 18, line 10, delete "display displaying" and insert therefor --displaying--.

Claim 19, column 19, line 35, delete "display displaying" and insert therefor --displaying--.

Claim 20, column 19, line 66, delete "systems client and" and insert therefor --systems and--.

Claim 36, column 24, line 4, delete "an incluiry from" and insert therefor --an inquiry from--.

Signed and Sealed this

Twenty-second Day of December, 2009

David J. Kappos
*Director of the United States Patent and Trademark Office*